United States Patent
Abdul-Rahman et al.

(10) Patent No.: US 12,384,711 B2
(45) Date of Patent: Aug. 12, 2025

(54) METHODS AND APPARATUS FOR MANUFACTURING A GLASS RIBBON

(71) Applicant: Corning Incorporated, Corning, NY (US)

(72) Inventors: Rashid Abdul-Rahman, Horseheads, NY (US); Bulent Kocatulum, Horseheads, NY (US); Timothy L Lansberry, Watkins Glen, NY (US); Bradley Clayton O'Connor, Rome, PA (US)

(73) Assignee: CORNING INCORPORATED, Corning, NY (US)

(*) Notice: Subject to any disclaimer, the term of this patent is extended or adjusted under 35 U.S.C. 154(b) by 582 days.

(21) Appl. No.: 17/794,090

(22) PCT Filed: Feb. 1, 2021

(86) PCT No.: PCT/US2021/015997
§ 371 (c)(1),
(2) Date: Jul. 20, 2022

(87) PCT Pub. No.: WO2021/158460
PCT Pub. Date: Aug. 12, 2021

(65) Prior Publication Data
US 2023/0056198 A1    Feb. 23, 2023

Related U.S. Application Data

(60) Provisional application No. 62/969,282, filed on Feb. 3, 2020.

(51) Int. Cl.
*C03B 17/06*    (2006.01)

(52) U.S. Cl.
CPC .......... *C03B 17/068* (2013.01); *C03B 17/064* (2013.01); *C03B 17/067* (2013.01)

(58) Field of Classification Search
CPC .................................................... C03B 17/064
See application file for complete search history.

(56) References Cited

U.S. PATENT DOCUMENTS 3,519,411 A * 7/1970 Cortright .............. C03B 17/064
                                                             65/347
7,414,001 B2    8/2008 Helfinstine et al.
(Continued)

FOREIGN PATENT DOCUMENTS

CN    107108307 A    8/2017
CN    110719895 A    1/2020
(Continued)

OTHER PUBLICATIONS

International Search Report and Written Opinion of the International Searching Authority; PCT/US21/015997 Mailed on May 20, 2021, 11 pages; Korean Patent Office.
(Continued)

*Primary Examiner* — Erin Snelting
(74) *Attorney, Agent, or Firm* — Kevin M. Able; F. Brock Riggs

(57) ABSTRACT

A glass manufacturing apparatus includes a forming vessel including a first end and a second end. The first end includes a vessel surface defining a recess. The glass manufacturing apparatus includes a compression block positioned within the recess and including a first surface and a contact surface that contacts the vessel surface. The compression block applies a force to the forming vessel. The first surface includes a non-planar shape. The glass manufacturing apparatus includes a support apparatus including a support surface supporting the compression block. The support surface is in contact with a portion of the first surface.

19 Claims, 11 Drawing Sheets

(56) References Cited

U.S. PATENT DOCUMENTS

| | | |
|---|---|---|
| 7,748,236 B2 | 7/2010 | Pitbladdo |
| 8,042,361 B2 | 10/2011 | Pitbladdo |
| 9,120,691 B2 | 9/2015 | Park |
| 9,643,874 B2 | 5/2017 | Chung et al. |
| 9,840,431 B2 | 12/2017 | Lansberry et al. |
| 2003/0192349 A1 | 10/2003 | Meda et al. |
| 2004/0154336 A1 | 8/2004 | Pitbladdo |
| 2005/0183455 A1 | 8/2005 | Pitbladdo |
| 2008/0202164 A1 | 8/2008 | Hoysan |
| 2008/0276649 A1 | 11/2008 | Park |
| 2013/0192307 A1 | 8/2013 | Panin |
| 2014/0318523 A1 | 10/2014 | Schermerhorn |
| 2017/0197863 A1 | 7/2017 | Lansberry et al. |
| 2017/0362112 A1 | 12/2017 | Lansberry |
| 2020/0270161 A1 | 8/2020 | Delia et al. |

FOREIGN PATENT DOCUMENTS

| | | | |
|---|---|---|---|
| EP | 3233742 A1 | 10/2017 | |
| KR | 10-2017-0066485 A | 6/2017 | |
| KR | 10-2018-0081803 A | 7/2018 | |
| TW | 201904892 A | 2/2019 | |
| WO | 2012/132309 A1 | 10/2012 | |
| WO | 2018/222984 A2 | 12/2018 | |
| WO | WO-2018232092 A2 * | 12/2018 | ........... C03B 17/064 |

OTHER PUBLICATIONS

Taiwanese Patent Application No. 110103787, Office Action dated Nov. 11, 2024, 2 pages (English Translation only), Taiwanese Patent Office.

Korean Patent Application No. 10-2022-7030621, Office Action dated Mar. 24, 2025, 9 pages, Korean Patent Office.

\* cited by examiner

METHODS AND APPARATUS FOR MANUFACTURING A GLASS RIBBON

CROSS-REFERENCE TO RELATED APPLICATIONS

This application claims the benefit of priority under 35 U.S.C. § 371 of International Application Serial No.: PCT/US2021/015997, filed on Feb. 1, 2021, which claims the benefit of priority under 35 U.S.C. § 119 of U.S. Provisional Application Ser. No. 62/969,282 filed on Feb. 3, 2020, the contents of which are relied upon and incorporated herein by reference in their entirety.

This application claims the benefit of priority under 35 U.S.C. § 119 of U.S. Provisional Application Ser. No. 62/969,282 filed on Feb. 3, 2020, the content of which is relied upon and incorporated herein by reference in its entirety.

FIELD

The present disclosure relates generally to methods for manufacturing a glass ribbon and, more particularly, to methods for manufacturing a glass ribbon with a glass manufacturing apparatus comprising a compression block.

BACKGROUND

It is known to manufacture molten material into a glass ribbon with a glass manufacturing apparatus. To reduce sag of a forming vessel of the glass manufacturing apparatus, a force can be applied to an end of the forming vessel with a compression apparatus. However, the application of the force can, over time, cause damage to the forming vessel and/or to the compression apparatus.

SUMMARY

The following presents a simplified summary of the disclosure to provide a basic understanding of some embodiments described in the detailed description.

In some embodiments, a glass manufacturing apparatus can comprise a compression apparatus that can apply a force to an end of a forming vessel. The compression apparatus can comprise a compression block that may be in contact with a vessel surface of the forming vessel. The compression block can move relative to a support apparatus, with a friction-reducing material applied between the compression block and the support apparatus to reduce friction and facilitate movement of the compression block toward the forming vessel. The compression apparatus can comprise one or more of an insulating block or a heating element that can be attached to the support apparatus. As such, the compression block can move independently of the insulating block and the heating element, thus allowing the insulating block and/or the heating element to remain in place.

In accordance with some embodiments, a glass manufacturing apparatus can comprise a forming vessel that can comprise a first end and a second end. The first end can comprise a vessel surface defining a recess. The glass manufacturing apparatus can comprise a compression block positioned within the recess and comprising a first surface and a contact surface that contacts the vessel surface. The compression block can be configured to apply a force to the forming vessel. The first surface can comprise a non-planar shape. The glass manufacturing apparatus can comprise a support apparatus that can comprise a support surface supporting the compression block. The support surface may be in contact with a portion of the first surface.

In some embodiments, the first surface can comprise a first surface portion, a second surface portion, and a third surface portion. The first surface portion may be in contact with the support surface and can comprise a planar shape.

In some embodiments, the second surface portion and the third surface portion can be positioned on opposite sides of the first surface portion. The second surface portion can form a first angle that is from about 1 degree to about 3 degrees relative to the first surface portion. The third surface portion can form a second angle that is from about 1 degree to about 3 degrees relative to the first surface portion.

In some embodiments, the forming vessel can receive a molten material along a flow direction that may be parallel to a longitudinal direction of the forming vessel. The compression block can apply the force along a force direction that may be parallel to the flow direction and the longitudinal direction.

In some embodiments, the compression block can comprise an edge surface that can connect the contact surface and the first surface. The edge surface can comprise a rounded shape.

In some embodiments, the support surface can extend along a support plane. The compression block may be on a first side of the support plane.

In some embodiments, the support apparatus can comprise a second surface spaced apart from the vessel surface to define a support opening, and one or more of an insulating block attached to the second surface and positioned within the support opening between the support apparatus and the vessel surface, the insulating block comprising a thermally insulating material configured to thermally insulate the support apparatus from the forming vessel, or a heating element attached to the second surface and positioned within the support opening between the support apparatus and the vessel surface, the heating element comprising an electrically conductive material configured to increase a temperature of a portion of the forming vessel.

In accordance with some embodiments, a glass manufacturing apparatus can comprise a forming vessel that can comprise a first end and a second end. The first end can comprise a vessel surface defining a recess. The glass manufacturing apparatus can comprise a compression block positioned within the recess and comprising a contact surface that contacts the vessel surface. The compression block can be configured to apply a force to the forming vessel. The glass manufacturing apparatus can comprise a support apparatus that can comprise a support surface supporting the compression block and extending along a support plane. The compression block may be positioned on a first side of the support plane.

In some embodiments, the support apparatus can comprise a second surface spaced apart from the vessel surface to define a support opening, and one or more of an insulating block or a heating element. The insulating block can be attached to the second surface and may be positioned within the support opening between the support apparatus and the vessel surface. The insulating block may be positioned on a second side of the support plane and spaced apart from the compression block. The insulating block can comprise a thermally insulating material configured to thermally insulate the support apparatus from the forming vessel. The heating element can be attached to the second surface and may be positioned within the support opening between the support apparatus and the vessel surface. The heating element may be positioned on a second side of the support plane and spaced apart from the compression block. The heating element can comprise an electrically conductive material and may be configured to increase a temperature of a portion of the forming vessel.

In some embodiments, the compression block can comprise a second contact surface that may be substantially perpendicular to the contact surface. The contact surface may be in contact with a first vessel surface portion of the vessel surface and the second contact surface may be in contact with a third vessel surface portion of the vessel surface.

In some embodiments, the compression block can comprise a second edge surface that connects the contact surface and the second contact surface. The second edge surface can be angled relative to the contact surface and the second contact surface and may be spaced apart from the vessel surface.

In accordance with some embodiments, a glass manufacturing apparatus can comprise a forming vessel that can comprise a first end and a second end. The first end can comprise a vessel surface defining a recess. The glass manufacturing apparatus can comprise a compression block positioned within the recess and can comprise a contact surface that contacts the vessel surface. The compression block can be configured to apply a force to the forming vessel. The glass manufacturing apparatus can comprise a support apparatus that can comprise a support surface supporting the compression block. The support apparatus can comprise a second surface spaced apart from the vessel surface to define a support opening. The glass manufacturing apparatus can comprise an insulating block attached to the second surface and positioned within the support opening between the support apparatus and the vessel surface. The insulating block can comprise a thermally insulating material configured to thermally insulate the support apparatus from the forming vessel.

In some embodiments, the insulating block can comprise a first block portion attached to a second block portion. The first block portion can comprise a first protrusion and a first cavity. The second block portion can comprise a second protrusion and a second cavity. The first protrusion can be configured to be received within the second cavity and the second protrusion can be configured to be received within the first cavity.

In some embodiments, the first block portion and the second block portion can comprise a first face that faces the forming vessel and a second face that faces the support apparatus. The second face can comprise a face opening that extends along an axis when the first block portion is attached to the second block portion.

In some embodiments, the support apparatus can comprise a support protrusion extending from the second surface toward the forming vessel. The support protrusion can be configured to be received within the face opening to attach the first block portion and the second block portion to the support apparatus.

In some embodiments, the glass manufacturing apparatus can comprise an insulating block attached to the second surface and positioned within the support opening between the support apparatus and the vessel surface. The insulating block can comprise a thermally insulating material that can be configured to thermally insulate the support apparatus from the forming vessel.

In accordance with some embodiments, a glass manufacturing apparatus can comprise a forming vessel that can comprise a first end and a second end. The first end can comprise a vessel surface that can define a recess. The glass manufacturing apparatus can comprise a compression block positioned within the recess and comprising a contact surface that contacts the vessel surface. The compression block can be configured to apply a force to the forming vessel. The glass manufacturing apparatus can comprise a support apparatus that can comprise a support surface supporting the compression block. The support apparatus can comprise a second surface spaced apart from the vessel surface to define a support opening. The glass manufacturing apparatus can comprise a heating element attached to the second surface and positioned within the support opening between the support apparatus and the vessel surface. The heating element can comprise an electrically conductive material configured to increase a temperature of a portion of the forming vessel.

In some embodiments, the support apparatus can comprise a plurality of attachment brackets that can extend from the second surface toward the forming vessel.

In some embodiments, the heating element can comprise a first opening and a second opening. One of the plurality of attachment brackets can be received within the first opening and another of the plurality of attachment brackets can be received within the second opening when the heating element is attached to the second surface.

In some embodiments, the heating element can extend a first length between a first end and a second end along a first axis parallel to the second surface. The compression block can extend a second length along a second axis parallel to the first axis. The first length may be substantially equal to the second length.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
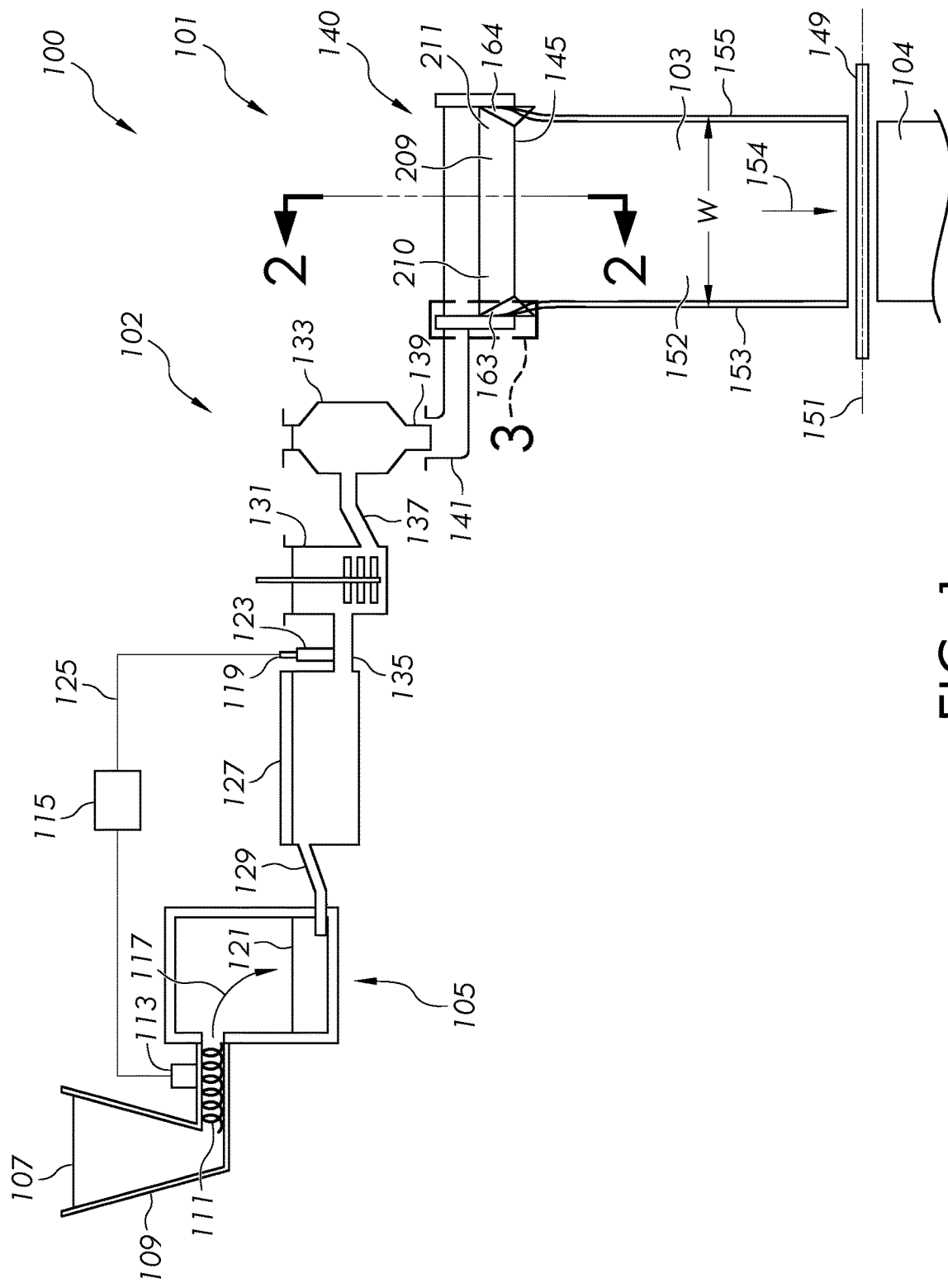
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for manufacturing a glass ribbon. Methods and apparatus for producing a glass ribbon will now be described by way of example embodiments for producing a glass ribbon from a ribbon of glass-forming material. As schematically illustrated in FIG. 1, in some embodiments, an exemplary glass manufacturing apparatus 100 can comprise a glass melting and delivery apparatus 102 and a forming apparatus 101 comprising a forming vessel 140 designed to produce a ribbon of glass-forming material 103 from a quantity of molten material 121. In some embodiments, the ribbon of glass-forming material 103 can comprise a central portion 152 positioned between opposite edge portions (e.g., edge beads) formed along a first outer edge 153 and a second outer edge 155 of the ribbon of glass-forming material 103, wherein a thickness of the edge portions can be greater than a thickness of the central portion. Additionally, in some embodiments, a separated glass ribbon 104 can be separated from the ribbon of glass-forming material 103 along a separation path 151 by a glass separator 149 (e.g., scribe, score wheel, diamond tip, laser, etc.).

In some embodiments, the glass melting and delivery apparatus 102 can comprise a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten material 121. In some embodiments, a melt probe 119 can be employed to measure a level of molten material 121 within a standpipe 123 and communicate the measured information to the controller 115 by way of a communication line 125.

Additionally, in some embodiments, the glass melting and delivery apparatus 102 can comprise a first conditioning station comprising a fining vessel 127 located downstream from the melting vessel 105 and coupled to the melting vessel 105 by way of a first connecting conduit 129. In some embodiments, molten material 121 can be gravity fed from the melting vessel 105 to the fining vessel 127 by way of the first connecting conduit 129. For example, in some embodiments, gravity can drive the molten material 121 through an interior pathway of the first connecting conduit 129 from the melting vessel 105 to the fining vessel 127. Additionally, in some embodiments, bubbles can be removed from the molten material 121 within the fining vessel 127 by various techniques.

In some embodiments, the glass melting and delivery apparatus 102 can further comprise a second conditioning station comprising a mixing chamber 131 that can be located downstream from the fining vessel 127. The mixing chamber 131 can be employed to provide a homogenous composition of molten material 121, thereby reducing or eliminating inhomogeneity that may otherwise exist within the molten material 121 exiting the fining vessel 127. As shown, the fining vessel 127 can be coupled to the mixing chamber 131 by way of a second connecting conduit 135. In some embodiments, molten material 121 can be gravity fed from the fining vessel 127 to the mixing chamber 131 by way of the second connecting conduit 135. For example, in some embodiments, gravity can drive the molten material 121 through an interior pathway of the second connecting conduit 135 from the fining vessel 127 to the mixing chamber 131.

Additionally, in some embodiments, the glass melting and delivery apparatus 102 can comprise a third conditioning station comprising a delivery chamber 133 that can be located downstream from the mixing chamber 131. In some embodiments, the delivery chamber 133 can condition the molten material 121 to be fed into an inlet conduit 141. For example, the delivery chamber 133 can function as an accumulator and/or flow controller to adjust and provide a consistent flow of molten material 121 to the inlet conduit 141. As shown, the mixing chamber 131 can be coupled to the delivery chamber 133 by way of a third connecting conduit 137. In some embodiments, molten material 121 can be gravity fed from the mixing chamber 131 to the delivery chamber 133 by way of the third connecting conduit 137. For example, in some embodiments, gravity can drive the molten material 121 through an interior pathway of the third connecting conduit 137 from the mixing chamber 131 to the delivery chamber 133. As further illustrated, in some embodiments, a delivery pipe 139 can be positioned to deliver molten material 121 to forming apparatus 101, for example the inlet conduit 141 of the forming vessel 140.

Forming apparatus 101 can comprise various embodiments of forming vessels in accordance with features of the disclosure, for example, a forming vessel with a wedge for fusion drawing the glass ribbon, a forming vessel with a slot to slot draw the glass ribbon, or a forming vessel provided with press rolls to press roll the glass ribbon from the forming vessel. In some embodiments, the forming apparatus 101 can comprise a sheet redraw, for example, with the forming apparatus 101 as part of a redraw process. For example, the glass ribbon 104, which can comprise a thickness, may be heated up and redrawn to achieve a thinner glass ribbon 104 comprising a smaller thickness. By way of illustration, the forming vessel 140 shown and disclosed below can be provided to fusion draw molten material 121 off a bottom edge, defined as a root 145, of a forming wedge 209 to produce the ribbon of glass-forming material 103. For example, in some embodiments, the molten material 121 can be delivered from the inlet conduit 141 to the forming vessel 140. The molten material 121 can then be formed into the ribbon of glass-forming material 103 based, in part, on the structure of the forming vessel 140. For example, as shown, the molten material 121 can be drawn off the bottom edge (e.g., root 145) of the forming vessel 140 along a draw path extending in a travel direction 154 of the glass manufacturing apparatus 100. In some embodiments, edge directors 163, 164 can direct the molten material 121 off the forming vessel 140 and define, in part, a width "W" of the ribbon of glass-forming material 103. In some embodiments, the width "W" of the ribbon of glass-forming material 103 extends between the first outer edge 153 of the ribbon of glass-forming material 103 and the second outer edge 155 of the ribbon of glass-forming material 103.

In some embodiments, the width "W" of the ribbon of glass-forming material 103, which extends between the first outer edge 153 of the ribbon of glass-forming material 103 and the second outer edge 155 of the ribbon of glass-forming material 103, can be greater than or equal to about 20 millimeters (mm), for example, greater than or equal to about 50 mm, for example, greater than or equal to about 100 mm, for example, greater than or equal to about 500 mm, for example, greater than or equal to about 1000 mm, for example, greater than or equal to about 2000 mm, for example, greater than or equal to about 3000 mm, for example, greater than or equal to about 4000 mm, although other widths less than or greater than the widths mentioned above can be provided in further embodiments. For example, in some embodiments, the width "W" of the ribbon of glass-forming material 103 can be within a range from about 20 mm to about 4000 mm, for example, within a range from about 50 mm to about 4000 mm, for example, within a range from about 100 mm to about 4000 mm, for example, within a range from about 500 mm to about 4000 mm, for example, within a range from about 1000 mm to about 4000 mm, for example, within a range from about 2000 mm to about 4000 mm, for example, within a range from about 3000 mm to about 4000 mm, for example, within a range from about 20 mm to about 3000 mm, for example, within a range from about 50 mm to about 3000 mm, for example, within a range from about 100 mm to about 3000 mm, for example, within a range from about 500 mm to about 3000 mm, for example, within a range from about 1000 mm to about 3000 mm, for example, within a range from about 2000 mm to about 3000 mm, for example, within a range from about 2000 mm to about 2500 mm, and all ranges and subranges therebetween.

Figure 2:
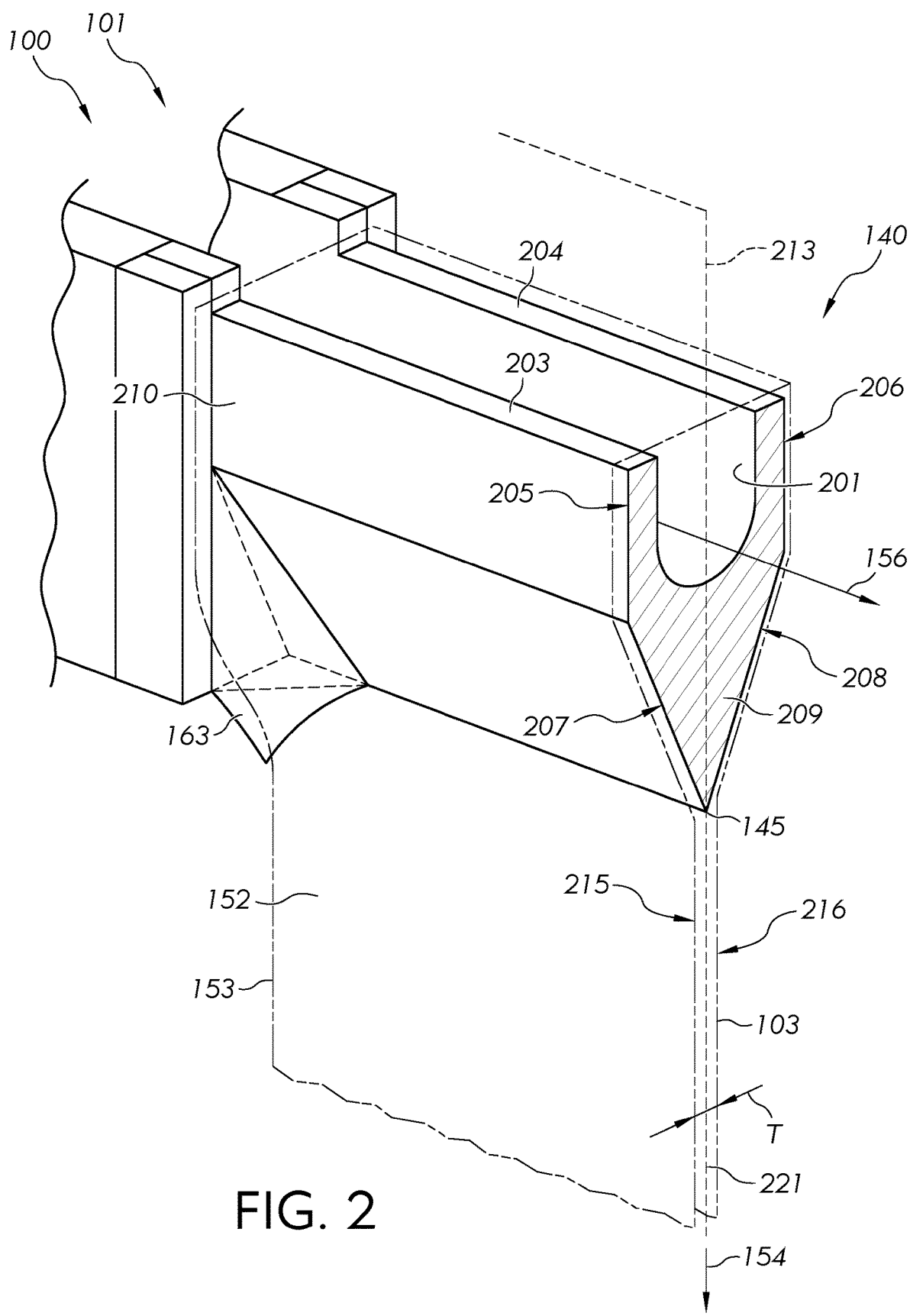
FIG. 2 illustrates a perspective cross-sectional view of the glass manufacturing apparatus along line 2-2 of FIG. 1 in accordance with embodiments of the disclosure.

FIG. 2 shows a cross-sectional perspective view of the forming apparatus 101 (e.g., forming vessel 140) along line 2-2 of FIG. 1. In some embodiments, the forming vessel 140 can comprise a trough 201 oriented to receive the molten material 121 from the inlet conduit 141. For illustrative purposes, cross-hatching of the molten material 121 is removed from FIG. 2 for clarity. The forming vessel 140 can further comprise the forming wedge 209 comprising a pair of downwardly inclined converging surface portions 207, 208 extending between opposed ends 210, 211 (See FIG. 1) of the forming wedge 209. The pair of downwardly inclined converging surface portions 207, 208 of the forming wedge 209 can converge along the travel direction 154 to intersect along the root 145 of the forming vessel 140. A draw plane 213 of the glass manufacturing apparatus 100 can extend through the root 145 along the travel direction 154. In some embodiments, the ribbon of glass-forming material 103 can be drawn in the travel direction 154 along the draw plane 213. As shown, the draw plane 213 can bisect the forming wedge 209 through the root 145 although, in some embodiments, the draw plane 213 can extend at other orientations relative to the root 145. In some embodiments, the ribbon of glass-forming material 103 can move along a travel path 221 that may be co-planar with the draw plane 213 in the travel direction 154.

Additionally, in some embodiments, the molten material 121 can flow in a flow direction 156 into and along the trough 201 of the forming vessel 140. For example, the forming vessel can receive the molten material 121 along the flow direction 156 that may be parallel to a longitudinal direction of the forming vessel 140. The longitudinal direction of the forming vessel 140 may extend between the first end 210 and a second end 211 (e.g., wherein the longitudinal direction may be transverse to the travel direction 154 illustrated in FIG. 1). The molten material 121 can then overflow from the trough 201 by simultaneously flowing over corresponding weirs 203, 204 and downward over the outer surfaces 205, 206 of the corresponding weirs 203, 204. Respective streams of molten material 121 can then flow along the downwardly inclined converging surface portions 207, 208 of the forming wedge 209 to be drawn off the root 145 of the forming vessel 140, where the flows converge and fuse into the ribbon of glass-forming material 103. The ribbon of glass-forming material 103 can then be drawn off the root 145 in the draw plane 213 along the travel direction 154. In some embodiments, the ribbon of glass-forming material 103 comprises one or more states of material based on a vertical location of the ribbon of glass-forming material 103. For example, at one location, the ribbon of glass-forming material 103 can comprise the viscous molten material 121, and at another location, the ribbon of glass-forming material 103 can comprise an amorphous solid in a glassy state (e.g., a glass ribbon).

The ribbon of glass-forming material 103 comprises a first major surface 215 and a second major surface 216 facing opposite directions and defining a thickness "T" (e.g., average thickness) of the ribbon of glass-forming material 103. In some embodiments, the thickness "T" of the ribbon of glass-forming material 103 can be less than or equal to about 2 millimeters (mm), less than or equal to about 1 millimeter, less than or equal to about 0.5 millimeters, for example, less than or equal to about 300 micrometers (nm), less than or equal to about 200 micrometers, or less than or equal to about 100 micrometers, although other thicknesses may be provided in further embodiments. For example, in some embodiments, the thickness "T" of the ribbon of glass-forming material 103 can be within a range from about 20 micrometers to about 200 micrometers, within a range from about 50 micrometers to about 750 micrometers, within a range from about 100 micrometers to about 700 micrometers, within a range from about 200 micrometers to about 600 micrometers, within a range from about 300 micrometers to about 500 micrometers, within a range from about 50 micrometers to about 500 micrometers, within a range from about 50 micrometers to about 700 micrometers, within a range from about 50 micrometers to about 600 micrometers, within a range from about 50 micrometers to about 500 micrometers, within a range from about 50 micrometers to about 400 micrometers, within a range from about 50 micrometers to about 300 micrometers, within a range from about 50 micrometers to about 200 micrometers, within a range from about 50 micrometers to about 100 micrometers, within a range from about 25 micrometers to about 125 micrometers, comprising all ranges and subranges of thicknesses therebetween. In addition, the ribbon of glass-forming material 103 can comprise a variety of compositions, for example, borosilicate glass, alumino-borosilicate glass, alkali-containing glass, or alkali-free glass, alkali aluminosilicate glass, alkaline earth aluminosilicate glass, soda-lime glass, etc.

In some embodiments, the glass separator 149 (see FIG. 1) can then separate the glass ribbon 104 from the ribbon of glass-forming material 103 along the separation path 151 to provide a plurality of separated glass ribbons 104 (i.e., a plurality of sheets of glass). According to other embodiments, a longer portion of the glass ribbon 104 may be coiled onto a storage roll. The separated glass ribbon can then be processed into a desired application, e.g., a display application. For example, the separated glass ribbon can be used in a wide range of display applications, comprising liquid crystal displays (LCDs), electrophoretic displays (EPD), organic light emitting diode displays (OLEDs), plasma display panels (PDPs), touch sensors, photovoltaics, and other electronic displays.

Figure 3:
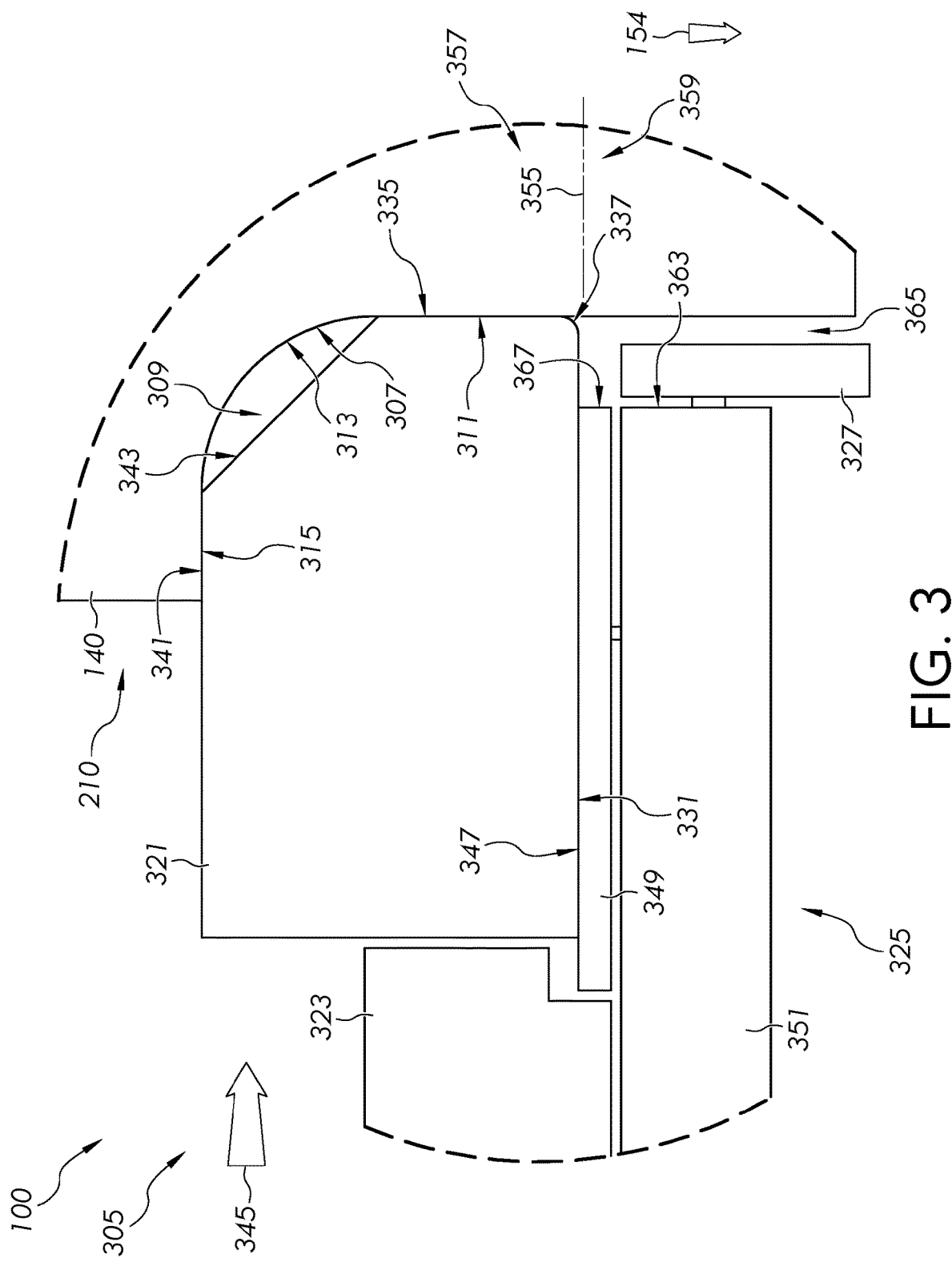
FIG. 3 illustrates an enlarged portion of the glass manufacturing apparatus taken at view 3 of FIG. 1 in accordance with embodiments of the disclosure.

FIG. 3 illustrates an enlarged view of a portion of the forming vessel 140 at view 3 of FIG. 1. In some embodiments, the forming vessel 140 can comprise a first end 210 and a second end 211 (e.g., the first end 210 and the second end 211 illustrated in FIG. 1), with the forming vessel 140 extending along an axis between the first end 210 and the second end 211. In some embodiments, due to the weight of the forming vessel 140 and the temperatures at which the forming vessel 140 may be exposed, the forming vessel 140 may experience sag, wherein a portion of the forming vessel 140 may bend along the travel direction 154. To reduce the likelihood of sagging of the forming vessel 140, the glass manufacturing apparatus 100 can comprise one or more compression apparatuses 305. For example, one compression apparatus 305 can be positioned at the first end 210 of the forming vessel 140 while another compression apparatus 305 can be positioned at the second end 211 of the forming vessel 140. In some embodiments, the one or more compression apparatuses 305 can apply a compressive force to the first end 210 and/or to the second end 211 of the forming vessel 140. The compressive force can reduce the sag of the forming vessel 140. In some embodiments, the compression apparatuses 305 at the first end 210 and the second end 211 can be substantially identical.

In some embodiments, the first end 210 can comprise a vessel surface 307 defining a recess 309. The recess 309 (e.g., a void, a space, an opening, etc.) can receive a portion of the compression apparatus 305. In some embodiments, the vessel surface 307 can comprise a plurality of surface portions, for example, a first vessel surface portion 311, a second vessel surface portion 313, and a third vessel surface portion 315. The first vessel surface portion 311, the second vessel surface portion 313, and the third vessel surface portion 315 may together form a non-planar surface. For example, the first vessel surface portion 311 can comprise a planar surface while the second vessel surface portion 313, which may be contiguous with and/or connected with the first vessel surface portion 311, may comprise a non-planar surface. In some embodiments, the second vessel surface portion 313 can comprise a rounded surface. In some embodiments, the third vessel surface portion 315 can comprise a planar surface and may be contiguous with and/or connected with the second vessel surface portion 313. As such, in some embodiments, the second vessel surface portion 313 may be attached to, and positioned between, the first vessel surface portion 311 and the third vessel surface portion 315. In some embodiments, the first vessel surface portion 311 and the third vessel surface portion 315 can form an angle relative to one another, for example, by extending substantially perpendicular to one another. For example, the first vessel surface portion 311 can extend substantially parallel to the travel direction 154 while the third vessel surface portion 315 can extend substantially perpendicular to the travel direction 154.

The compression apparatus 305 can comprise one or more structures for providing a force to the forming vessel 140. For example, in some embodiments, the compression apparatus 305 can comprise a compression block 321, a force block 323, a support apparatus 325, and an insulating block 327. With reference to the compression block 321, the glass manufacturing apparatus 100 can comprise the compression block 321 that may be positioned within the recess 309 and can comprise a first surface 331 and a contact surface 335 that contacts the vessel surface 307. In some embodiments, the first surface 331 can face the travel direction 154, for example, by being oriented to face a direction that is downstream from the forming vessel 140 relative to the movement of the ribbon of glass-forming material 103 along the travel direction 154. In some embodiments, the first surface 331 may be non-planar relative to the contact surface 335. For example, the first surface 331 may form an angle relative to the contact surface 335, for example, a 90° angle, such that the first surface 331 may be substantially perpendicular to the contact surface 335. The first surface 331 and the contact surface 335 can be connected by an edge surface 337. For example, the compression block 321 can comprise the edge surface 337 that may connect the contact surface 335 and the first surface 331. In some embodiments, the edge surface 337 can comprise a rounded shape with a radius of curvature. For example, in some embodiments, a radius of curvature of the edge surface 337 can be within a range from about 6 mm to about 10 mm, or about 8 mm. Due to the rounded shape of the edge surface 337 with the radius of curvature, the stress within the compression block 321 may be below a desired value during the application of the force to the forming vessel 140.

In some embodiments, the compression block 321 can comprise a second contact surface 341 that may be substantially perpendicular to the contact surface 335. For example, the second contact surface 341 can extend along a plane that forms an angle relative to a plane along which the contact surface 335 extends, for example, a 90° angle. In some embodiments, the second contact surface 341 can face a direction opposite the travel direction 154, for example, an upstream direction relative to the movement of the ribbon of glass-forming material 103 along the travel direction 154. In some embodiments, the second contact surface 341 may be substantially parallel to the first surface 331. The compression block 321 can comprise a second edge surface 343 that connects the contact surface 335 and the second contact surface 341. For example, the second edge surface 343 can be positioned between the contact surface 335 and the second contact surface 341. In some embodiments, the second edge surface 343 can be angled relative to the contact surface 335 and the second contact surface 341 and may be spaced apart from the vessel surface 307. For example, by being angled relative to the contact surface 335 and the second contact surface 341, the second edge surface 343 can extend non-planar relative to the contact surface 335 and non-planar relative to the second contact surface 341. In some embodiments, the second edge surface 343 can form an angle relative to the contact surface 335 that is within a range from about 90 degrees to about 180 degrees, or within a range from about 120 degrees to about 150 degrees. In some embodiments, the second edge surface 343 can form an angle relative to the second contact surface 341 that is within a range from about 90 degrees to about 180 degrees, or within a range from about 120 degrees to about 150 degrees. In some embodiments, one or more of the contact surface 335 or the second edge surface 343 can comprise a heating element 602. The heating element 602 can comprise an electrically conductive material that can extend along and/or within the contact surface 335 and/or the second edge surface 343. The heating element 602 can generate heat to increase a temperature of a portion of the forming vessel 140.

In some embodiments, the compression block 321 can contact the vessel surface 307 while the compression block 321 is positioned within the recess 309. For example, the contact surface 335 can be in contact with the first vessel surface portion 311 of the vessel surface 307 and the second contact surface 341 can be in contact with the third vessel surface portion 315 of the vessel surface 307. In some embodiments, with the contact surface 335 in contact with the first vessel surface portion 311 and the second contact surface 341 in contact with the third vessel surface portion 315, the second edge surface 343 may be spaced apart from the second vessel surface portion 313 of the vessel surface 307. The contact surface 335 may be substantially parallel to the first vessel surface portion 311 such that when the contact surface 335 is in contact with the first vessel surface portion 311 the contact surface 335 may be flush with the first vessel surface portion 311. The second contact surface 341 may be substantially parallel to the third vessel surface portion 315 such that when the second contact surface 341 is in contact with the third vessel surface portion 315 the second contact surface 341 may be flush with the third vessel surface portion 315. In some embodiments, due to the contact between the third vessel surface portion 315 and the second contact surface 341, a portion of the weight of the forming vessel 140 can rest upon and/or be supported by the compression block 321.

With the compression block 321 in contact with the vessel surface 307, the compression block 321 can apply a force to the forming vessel 140. For example, the glass manufacturing apparatus 100 can comprise the force block 323 that can be positioned adjacent to and in contact with the compression block 321. The force block 323 can be positioned in contact with a surface of the compression block 321 that is opposite the contact surface 335 such that the compression block 321 may be positioned between the first vessel surface portion 311 and the force block 323. In some embodiments, the force block 323 can apply a force to the compression block 321 along a force direction 345 that may be transverse to the travel direction 154 and toward the forming vessel 140. In some embodiments, by moving in the force direction 345, the force block 323 can cause the compression block 321 to apply a compressive force to the forming vessel 140, for example, the first vessel surface portion 311. For example, the compression block 321 can apply a force along the force direction 345 (e.g., to the forming vessel 140) that may be parallel to the flow direction 156 (e.g., illustrated in FIG. 2) and the longitudinal direction of the forming vessel 140. The compressive force can mitigate sag of the forming vessel 140.

In some embodiments, the glass manufacturing apparatus 100 can comprise the support apparatus 325, which can comprise a support surface 347 supporting the compression block 321. In some embodiments, the support surface 347 can be in contact with a portion of the first surface 331. For example, the compression block 321 can rest upon the support apparatus 325, with the first surface 331 facing the support surface 347. In some embodiments, support apparatus 325 can comprise one or more structures that can support the compression block 321. For example, in some embodiments, the support apparatus 325 can comprise a movement plate 349 and a support plate 351. The movement plate 349 can comprise the support surface 347 such that the compression block 321 can rest upon the movement plate 349 with the first surface 331 in contact with the support surface 347 of the movement plate 349. In some embodiments, the compression block 321 can move relative to the movement plate 349 of the support apparatus 325. For example, as the compression block 321 moves toward the forming vessel 140 (e.g., along the force direction 345), the compression block 321 can move relative to the movement plate 349. To facilitate movement and reduce friction between the compression block 321 and the movement plate 349, in some embodiments, a friction-reducing material may be applied to the support surface 347 and/or to the first surface 331. For example, in some embodiments, the movement plate 349 can comprise an alumina material and the compression block 321 can comprise a zircon material. In some embodiments, the friction-reducing material can comprise a copper-oxide based thermal paste. The friction-reducing material can reduce friction between the compression block 321 and the movement plate 349 such that the compression block 321 can move, in response to the force applied by the force block 323, relative to the movement plate 349. In some embodiments, the support plate 351 can support the movement plate 349, wherein the movement plate 349 may be in contact with and may rest on the support plate 351. In some embodiments, the movement plate 349 can support the compression block 321, wherein the compression block 321 may be in contact with and may rest on the movement plate 349, with the compression block 321 spaced apart from and not in contact with the support plate 351. In some embodiments, the movement plate 349 can comprise a height that is within a range from about 6 mm to about 18 mm, or about 12.7 mm.

In some embodiments, the support surface 347 can extend along a support plane 355. The support plane 355 can define a first side 357 and a second side 359 (e.g., wherein the support plane 355 extends between the first side 357 and the second side 359). In some embodiments, the compression block 321 can be positioned on the first side 357 of the support plane 355, while the support plate 351 can be positioned on the second side 359 of the support plane 355. For example, by being positioned on the first side 357 of the support plane 355, in some embodiments, an entirety of the compression block 321, including the first surface 331, may be positioned on the first side 357, with no portions of the compression block 321 intersecting the support plane 355 to lie on the second side 359. In some embodiments, by being positioned on the second side 359, an entirety of the support plate 351 may be positioned on the second side 359, with no portions of the support plate 351 intersecting the support plane 355 to lie on the first side 357. In some embodiments, the support apparatus 325 can comprise a second surface 363 spaced apart from the vessel surface 307 to define a support opening 365. For example, the support plate 351 can comprise the second surface 363 and the movement plate 349 can comprise a third surface 367. In some embodiments, the second surface 363 of the support plate 351 and the third surface 367 of the movement plate 349 can face the forming vessel 140. The second surface 363 of the support plate 351 and the third surface 367 of the movement plate 349 can be spaced apart from the forming vessel 140, for example, the vessel surface 307, to define the support opening 365. In some embodiments, the support opening 365 may be located between the forming vessel 140 and the support apparatus 325 (e.g., the movement plate 349 and the support plate 351).

In some embodiments, the glass manufacturing apparatus 100 can comprise a thermal element, for example, the insulating block 327. The insulating block 327 may be attached to the second surface 363 and positioned within the support opening 365 between the support apparatus 325 and the vessel surface 307. The insulating block 327 can be attached to the second surface 363 in several ways. For example, in some embodiments, mechanical fasteners (e.g., screws, bolts, etc.) can attach the insulating block 327 to the second surface 363 of the support plate 351. In some embodiments, an attachment apparatus (e.g., similar to an attachment apparatus 901 illustrated in FIG. 9) can facilitate removable attachment of the insulating block 327 to the second surface 363. The insulating block 327 can comprise a thermally insulating material that can thermally insulate the support apparatus 325 from the forming vessel 140. For example, in some embodiments, the insulating block 327 can comprise a refractory material comprising one or more of zircon, zirconia, alumina, magnesium oxide, silicon carbide, silicon nitride, silicon oxynitride, xenotime, monazite, or alloys thereof. In some embodiments, the support plate 351 can comprise a metal material, for example, steel, such that the insulating block 327 can shield the support plate 351 from the temperatures of the forming vessel 140. For example, by being positioned within the support opening 365, the insulating block 327 can thermally insulate the support plate 351 from the forming vessel 140, thus reducing the temperature that the support plate 351 may experience.

In some embodiments, the insulating block 327 may be positioned on the second side 359 of the support plane 355 and may be spaced apart from the compression block 321. For example, by being spaced apart from the compression block 321, a gap may exist between the insulating block 327 and the first surface 331 of the compression block 321 such that the compression block 321 may move (e.g., in the force direction 345) independently of the insulating block 327. In some embodiments, the insulating block 327 may remain attached to and/or in contact with the support apparatus 325 while the compression block 321 is moved in the force direction 345 and applies a force to the forming vessel 140. By providing the insulating block 327 separately and spaced apart from the compression block 321, inadvertent detachment of the insulating block 327 from the support apparatus 325 may be avoided when the compression block 321 applies a force to the forming vessel 140.

Figure 4:
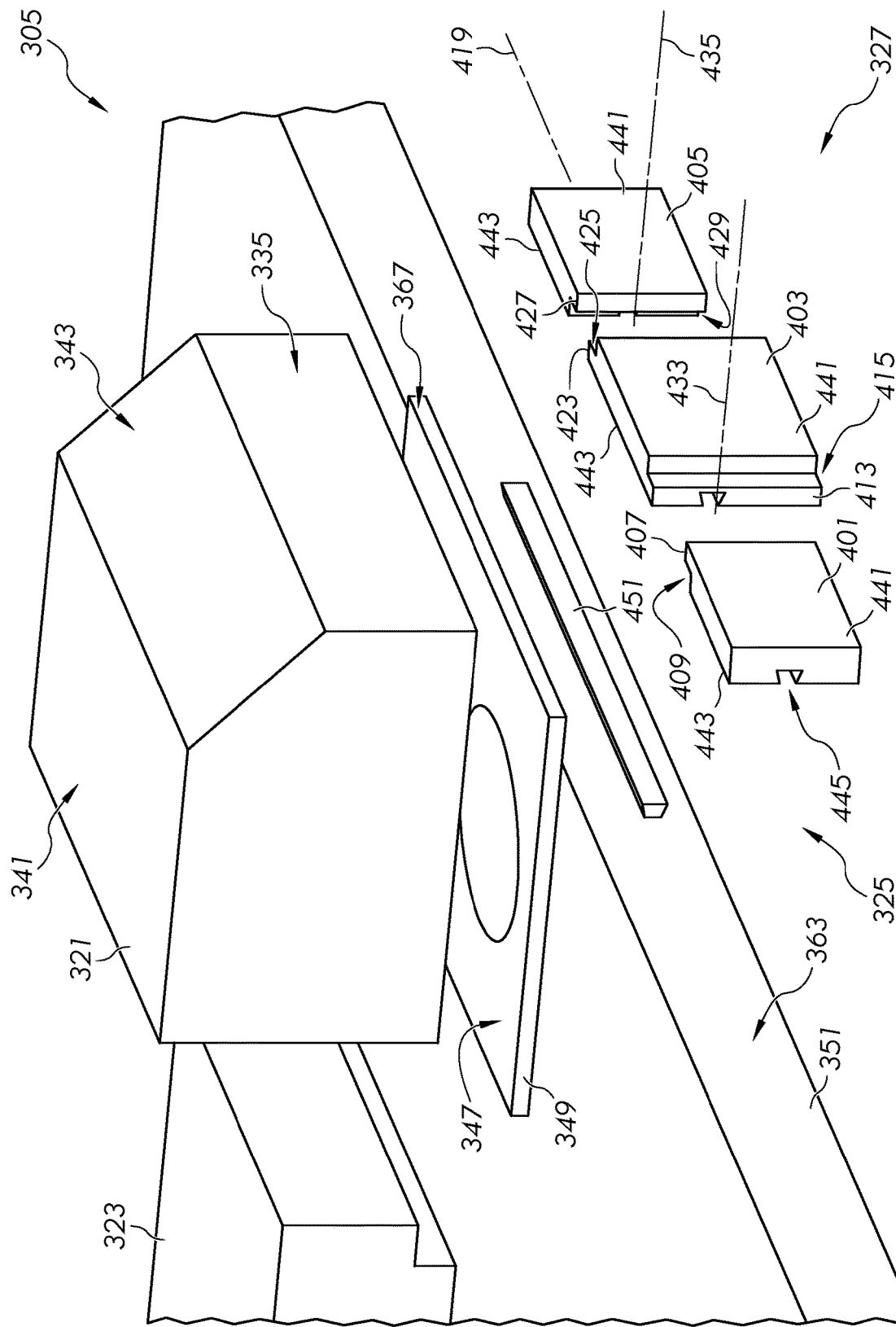
FIG. 4 illustrates a perspective exploded view of a portion of a compression apparatus of the glass manufacturing apparatus in accordance with embodiments of the disclosure.

Referring to FIG. 4, an exploded illustration of the compression apparatus 305 of FIG. 3 is illustrated. In some embodiments, the insulating block 327 can comprise a unitary, one-piece structure that can be attached to the second surface 363. However, as illustrated in FIG. 4, the insulating block 327 is not limited to a one-piece structure, but, rather, can comprise a plurality of portions. For example, in some embodiments, the insulating block 327 can comprise a plurality of block portions, for example, a first block portion 401, a second block portion 403, and a third block portion 405. The first block portion 401, the second block portion 403, and the third block portion 405 can be attached to one another and may be attached to the support apparatus 325. For example, the insulating block 327 can comprise the first block portion 401 attached to the second block portion 403. In some embodiments, the first block portion 401 can comprise a first protrusion 407 and a first cavity 409. The second block portion 403 can comprise a second protrusion 413 and a second cavity 415. The first protrusion 407 can be received within the second cavity 415 and the second protrusion 413 can be received within the first cavity 409. For example, the first block portion 401, the second block portion 403, and the third block portion 405 can be arranged along an axis 419, wherein the first block portion 401, the second block portion 403, and the third block portion 405 may intersect the axis when attached together, with the axis 419 extending substantially parallel to the second surface 363. In some embodiments, the first protrusion 407 can extend from the first block portion 401 along the axis 419 toward the second block portion 403. The first cavity 409 may be bordered by the first protrusion 407. In some embodiments, the second protrusion 413 can extend from the second block portion 403 along the axis 419 toward the first block portion 401. The second cavity 415 may be bordered by the second protrusion 413. In some embodiments, the first protrusion 407 may be aligned with the second cavity 415 and the second protrusion 413 may be aligned with the first cavity 409. As such, the first block portion 401 and the second block portion 403 may be brought into contact with one another such that the first protrusion 407 may be received within the second cavity 415 and the second protrusion 413 may be received within the first cavity 409.

In some embodiments, the second block portion 403 and the third block portion 405 can be attached in a similar manner as the attachment between the first block portion 401 and the second block portion 403. For example, the second block portion 403 can comprise a third protrusion 423 and a third cavity 425. The third block portion 405 can comprise a fourth protrusion 427 and a fourth cavity 429. The third protrusion 423 can be received within the fourth cavity 429 and the fourth protrusion 427 can be received within the third cavity 425. For example, the third protrusion 423 can extend from the second block portion 403 along the axis 419 toward the third block portion 405. The third cavity 425 may be bordered by the third protrusion 423. In some embodiments, the fourth protrusion 427 can extend from the third block portion 405 along the axis 419 toward the second block portion 403. The fourth cavity 429 may be bordered by the fourth protrusion 427. In some embodiments, the third protrusion 423 may be aligned with the fourth cavity 429 and the fourth protrusion 427 may be aligned with the third cavity 425. As such, the second block portion 403 and the third block portion 405 may be brought into contact with one another such that the third protrusion 423 may be received within the fourth cavity 429 and the fourth protrusion 427 may be received within the third cavity 425.

The attachment of the first block portion 401, the second block portion 403, and the third block portion 405 yields several benefits. For example, when the first block portion 401, the second block portion 403, and the third block portion 405 are attached, gaps through the insulating block 327 (e.g., through the first block portion 401, the second block portion 403, and the third block portion 405) may be avoided. In some embodiments, a first intersecting axis 433 can extend substantially perpendicular to the axis 419 along which the first block portion 401, the second block portion 403, and the third block portion 405 are arranged. The first intersecting axis 433 can intersect the insulating block 327 and the support plate 351, for example, by being substantially perpendicular to the second surface 363. In some embodiments, the first intersecting axis 433 can be oriented to extend through a location between the first block portion 401 and the second block portion 403. However, due to the first protrusion 407 being received within the second cavity 415 and the second protrusion 413 being received within the first cavity 409, the first protrusion 407 and the second protrusion 413 can extend adjacent to and parallel to one another. As such, the first intersecting axis 433 may intersect the first protrusion 407 and/or the second protrusion 413. By avoiding a gap between the first block portion 401 and the second block portion 403, heat transfer between the first block portion 401 and the second block portion 403 to the support plate 351 may be reduced, thus increasing the thermal insulation of the support apparatus 325 from the forming vessel 140.

Similarly, in some embodiments, a second intersecting axis 435 can extend substantially parallel to the first intersecting axis 433. The second intersecting axis 435 can intersect the insulating block 327 and the support plate 351, for example, by being substantially perpendicular to the second surface 363. In some embodiments, the second intersecting axis 435 can be oriented to extend through a location between the second block portion 403 and the third block portion 405. However, due to the third protrusion 423 being received within the fourth cavity 429 and the fourth protrusion 427 being received within the third cavity 425, the third protrusion 423 and the fourth protrusion 427 can extend adjacent to and parallel to one another. As such, the second intersecting axis 435 may intersect the third protrusion 423 and/or the fourth protrusion 427. By avoiding a gap between the second block portion 403 and the third block portion 405, heat transfer between the second block portion 403 and the third block portion 405 to the support plate 351 may be reduced, thus increasing the thermal insulation of the support apparatus 325 from the forming vessel 140.

In some embodiments, the first block portion 401, the second block portion 403, and the third block portion 405 can comprise a first face 441 that faces the forming vessel 140 and a second face 443 that faces the support apparatus 325. For example, when the first block portion 401, the second block portion 403, and the third block portion 405 are attached to one another, the first face 441 may comprise a substantially planar surface that faces the forming vessel 140. When the first block portion 401, the second block portion 403, and the third block portion 405 are attached to one another, the second face 443 may comprise a substantially planar surface that faces the support apparatus 325. In some embodiments, the second face 443 can comprise a face opening 445 that extends along the axis 419 when the first block portion 401 is attached to the second block portion 403, and when the second block portion 403 is attached to the third block portion 405. For example, the face opening 445 can comprise a groove, a channel, an indentation, or the like formed in the second face 443, wherein the face opening 445 in the first block portion 401, the second block portion 403, and the third block portion 405 can be aligned such that the face opening 445 may extend linearly along the axis 419.

Figure 5:
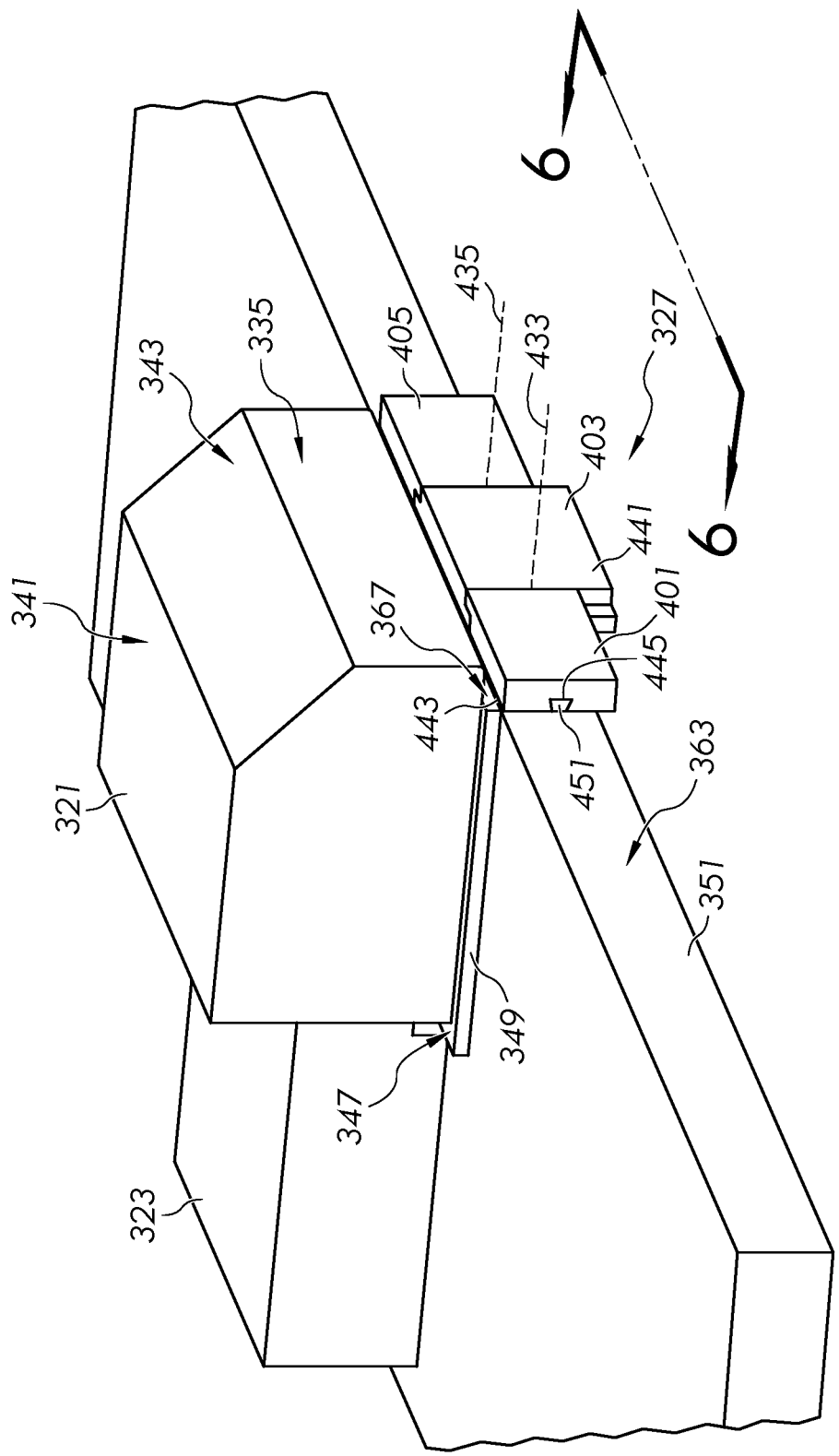
FIG. 5 illustrates a perspective view of the portion of the compression apparatus of FIG. 4 in a fully assembled state in accordance with embodiments of the disclosure.

Referring to FIGS. 4-5, in some embodiments, the support apparatus 325 can comprise a support protrusion 451 extending from the second surface 363 toward the forming vessel 140. For example, the support protrusion 451 can comprise an outcropping, a protuberance, an extension, etc. that extends from the second surface 363 toward the forming vessel 140. In some embodiments, the support protrusion 451 can extend substantially linearly along the second surface 363. The support protrusion 451 may be sized to be received within the face opening 445 of the first block portion 401, the second block portion 403, and the third block portion 405. For example, in some embodiments, the support protrusion 451 can comprise a shape that may substantially match a shape of the face opening 445, with the support protrusion 451 comprising a smaller cross-sectional size than a cross-sectional size of the face opening 445. The support protrusion 451 can be received within the face opening 445 to attach the first block portion 401, the second block portion 403, and the third block portion 405 to the support apparatus 325. For example, when the support protrusion 451 is received within the face opening 445, movement of the first block portion 401, the second block portion 403, and the third block portion 405 relative to the support plate 351 may be limited, such that the first block portion 401, the second block portion 403, and the third block portion 405 may be attached to the support plate 351.

Figure 6:
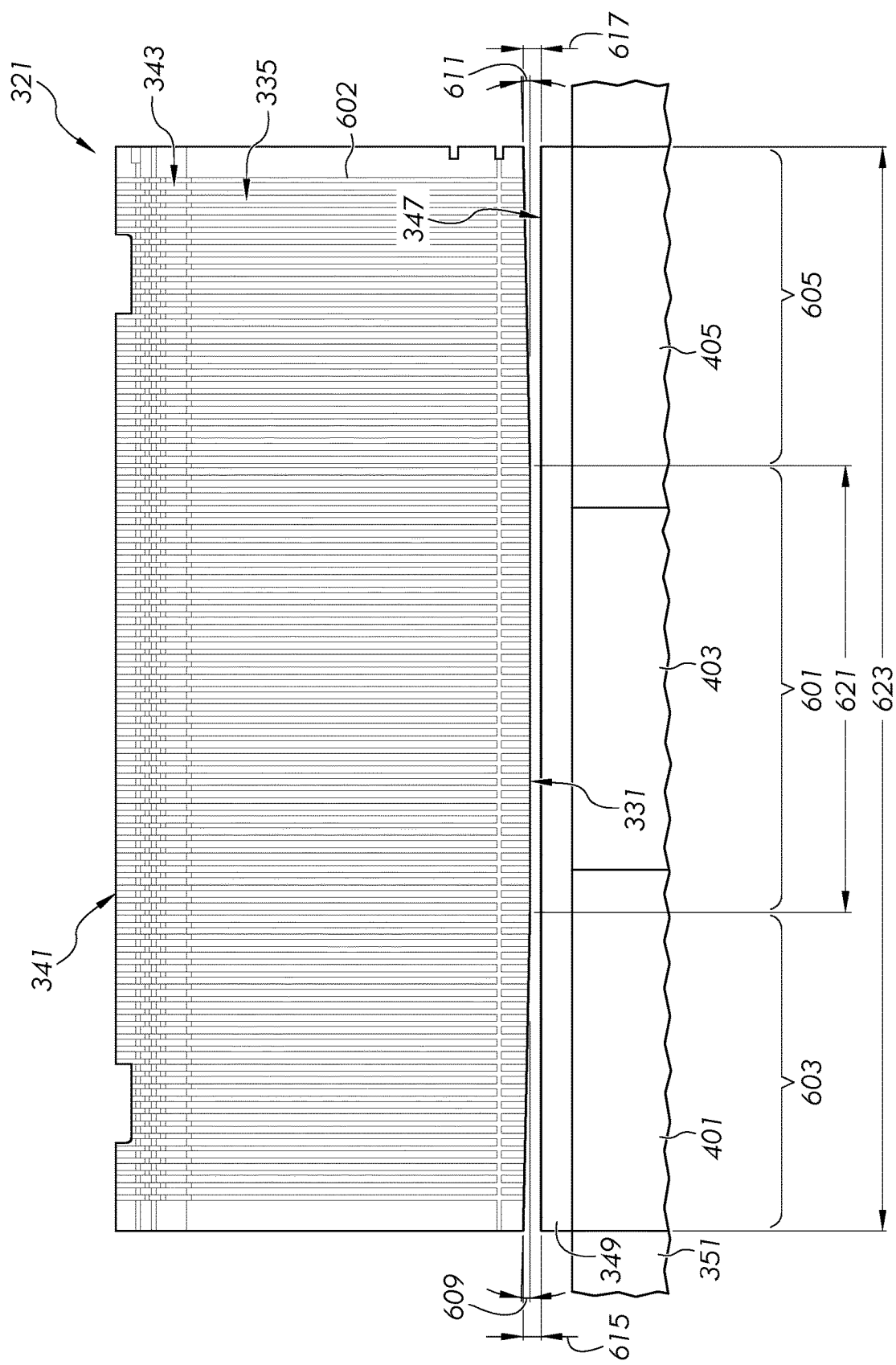
FIG. 6 illustrates a front view of a contact surface of a compression block as viewed along line 6-6 of FIG. 5 in accordance with embodiments of the disclosure.

FIG. 6 illustrates a front view of the contact surface 335 of the compression block 321 as viewed along line 6-6 of FIG. 5, with the compression block 321 supported by the movement plate 349. In some embodiments, the first surface 331 can comprise one or more surface portions. For example, the first surface 331 can comprise a first surface portion 601, a second surface portion 603, and a third surface portion 605. The first surface portion 601 may be positioned between the second surface portion 603 and the third surface portion 605 such that the second surface portion 603 and the third surface portion 605 may be positioned on opposite sides of the first surface portion 601. In some embodiments, the first surface 331 can comprise a non-planar shape. For example, the second surface portion 603 can form a first angle 609 that may be from about 1 degree to about 3 degrees relative to the first surface portion 601. In some embodiments, the first angle 609 may be different than about 1 degree to about 3 degrees, for example, wherein the first angle 609 may be from about 0.5 degrees to about 10 degrees. The first angle 609 may be defined between the second surface portion 603 and a plane along which the first surface portion 601 extends. In some embodiments, the third surface portion 605 can form a second angle 611 that may be from about 1 degree to about 3 degrees relative to the first surface portion 601. In some embodiments, the second angle 611 may be different than about 1 degree to about 3 degrees, for example, wherein the second angle 611 may be from about 0.5 degrees to about 10 degrees. The second angle 611 may be defined between the third surface portion 605 and the plane along which the first surface portion 601 extends. In some embodiments, the first surface portion 601 and the second surface portion 603 may be non-planar relative to one another, and the first surface portion 601 and the third surface portion 605 may be non-planar relative to one another. For example, in some embodiments, the first surface portion 601 may be substantially planar. In some embodiments, the second surface portion 603 may be substantially planar. However, due to the second surface portion 603 forming the first angle 609 relative to the first surface portion 601, the second surface portion 603 may be non-planar relative to the first surface portion 601. In some embodiments, the third surface portion 605 may be substantially planar. However, due to the third surface portion 605 forming the second angle 611 relative to the first surface portion 601, the third surface portion 605 may be non-planar relative to the first surface portion 601.

In some embodiments, the first surface portion 601 may be in contact with the support surface 347 and may comprise a planar shape such that the first surface portion 601 may extend substantially parallel to the support surface 347. For example, the first surface portion 601 can rest on the support surface 347 such that the support surface 347 may support the compression block 321. In some embodiments, due to the second surface portion 603 and the third surface portion 605 being non-planar relative to the first surface portion 601, the second surface portion 603 and the third surface portion 605 may be non-planar relative to the support surface 347 when the first surface portion 601 is in contact with the support surface 347. For example, a first distance 615 can separate the second surface portion 603 from the support surface 347 and a second distance 617 can separate the third surface portion 605 from the support surface 347. In some embodiments, by spacing the second surface portion 603 and the third surface portion 605 apart from the support surface 347, the support surface 347 can be in contact with a portion of the first surface 331 (e.g., the first surface portion 601) while not being in contact with other portions of the first surface 331 (e.g., the second surface portion 603 and the third surface portion 605).

The non-planar shape of the first surface 331 can provide several benefits. For example, less than all of the first surface 331 of the compression block 321 may be in contact with the movement plate 349, with the first surface portion 601 in contact with the support surface 347. For example, a central portion (e.g., the first surface portion 601) may be in contact with the support surface 347, while lateral portions (e.g., the second surface portion 603 and the third surface portion 605) located on opposing sides of the central portion may be spaced apart from and not in contact with the support surface 347. As such, a contact area width 621, defined by a width of the compression block 321 that is in contact with the movement plate 349 (e.g., comprising a width of the first surface portion 601), may be less than a block width 623, defined by a total width of the compression block 321 between opposing sides of the compression block 321 (e.g., comprising a width of the first surface portion 601, the second surface portion 603, and the third surface portion 605). The force that may be applied by the compression block 321 to the movement plate 349 may therefore be limited to the contact area width 621. Due to the contact area width 621 being less than the block width 623, the force applied by the compression block 321 may be more concentrated at a smaller area of the movement plate 349, which can reduce a bending moment on the movement plate 349 and, thus, the overall stress on the compression block 321 and the movement plate 349.

Figure 7:
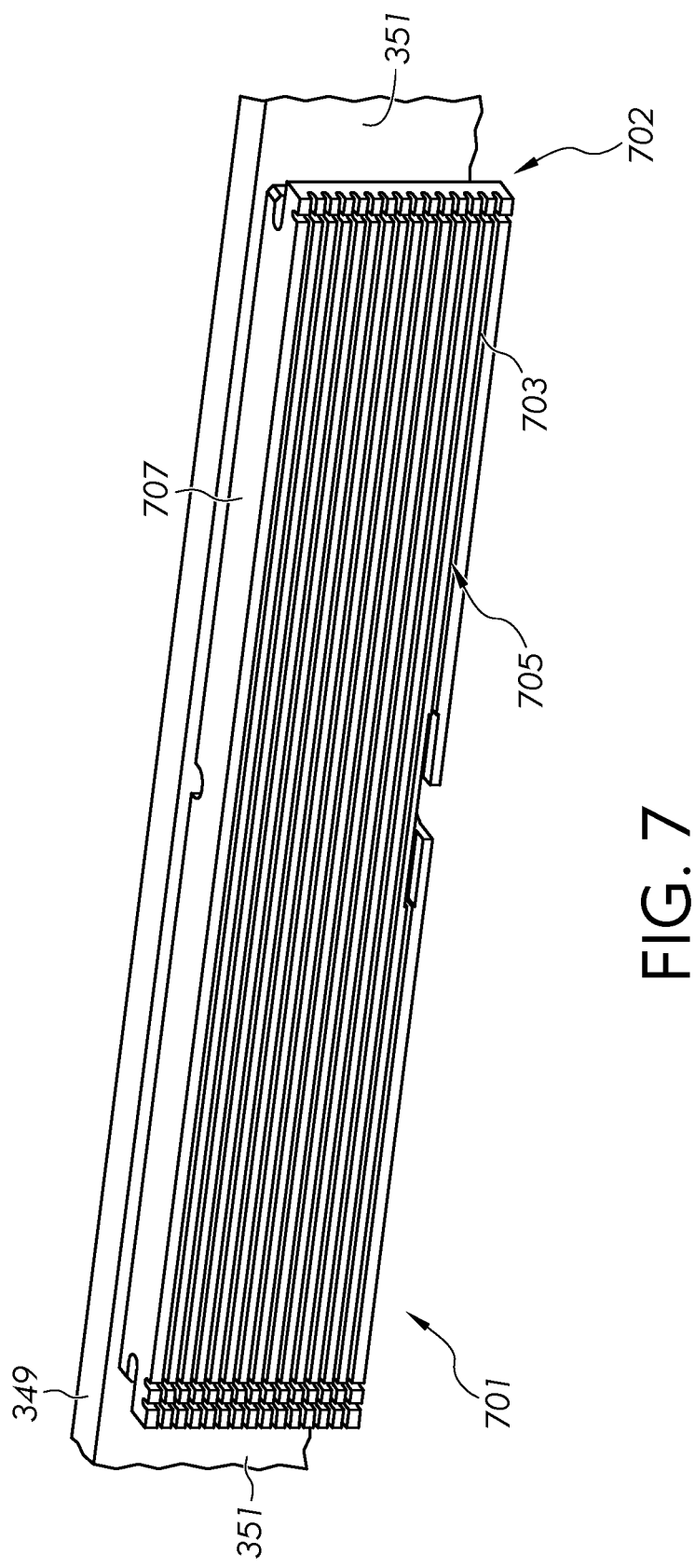
FIG. 7 illustrates a front perspective view of a heating element in accordance with embodiments of the disclosure.

Referring to FIG. 7, a perspective view of a heating element 701 is illustrated. In some embodiments, the heating element 701 can comprise one or more of a heating portion 702 and/or the insulating block 327 (e.g., illustrated in FIGS. 3-5). In some embodiments, the heating portion 702 of the heating element 701 can comprise an electrically conductive material 703 configured to increase a temperature of a portion of the forming vessel 140. For example, the heating portion 702 can comprise a resistive heating element comprising a metal material through which electrons can flow to generate an electric current which can produce heat. In some embodiments, the portion of the forming vessel 140 that may be heated by the heating portion 702 are the edge directors 163, 164 (e.g., illustrated in FIG. 2). For example, the electrically conductive material 703 can comprise a wire that can be positioned on a first surface 705 of the heating portion 702, with the first surface 705 facing the forming vessel 140. The electrically conductive material 703 can be arranged to wind along the first surface 705. In some embodiments, the heat generated by the electrically conductive material 703 can facilitate control of a temperature of the forming vessel 140. For example, with the heating portion 702 positioned in proximity to the forming vessel 140, the electrically conductive material 703 can generate heat, wherein the heat can increase a temperature of the portion of the forming vessel 140, for example, the edge directors 163, 164.

In some embodiments, the heating element 701 can comprise an insulating block 707 that can thermally insulate the support apparatus 325 (e.g., illustrated in FIG. 3) from the heating portion 702. For example, the insulating block 707 can comprise an identical material as the insulating block 327 illustrated in FIG. 3. In some embodiments, the insulating block 707 can comprise a unitary, one-piece structure that can be attached to the first surface 705. The insulating block 707 can comprise a dimension (e.g., length and width) that can substantially match a dimension of the first surface 705, such that the support apparatus 325 can be thermally insulated and shielded from the heat generated by the heating portion 702. In some embodiments, the heating element 602 (e.g., illustrated in FIG. 6) and the heating element 701 (e.g., illustrated in FIG. 7) can be operated independently of one another. For example, the heating element 602 (e.g., for the compression block 321) and the heating element 701 (e.g., for the heating portion 702 of the insulating block 327) can operate independently, such that the compression block 321 can be separately heated from the heating portion 702 of the insulating block 327. By operating independently, several benefits can be achieved. For example, if one of the heating elements 602, 701 is turned off, then the other of the heating elements 602, 701 may remain on. The heating element 602 can therefore operate at a temperature that may be different from a temperature of the heating element 701. As such, a desired and/or more finely tuned thermal profile can be achieved by heating the edge director 163 at a different temperature than the forming vessel 140.

Figure 8:
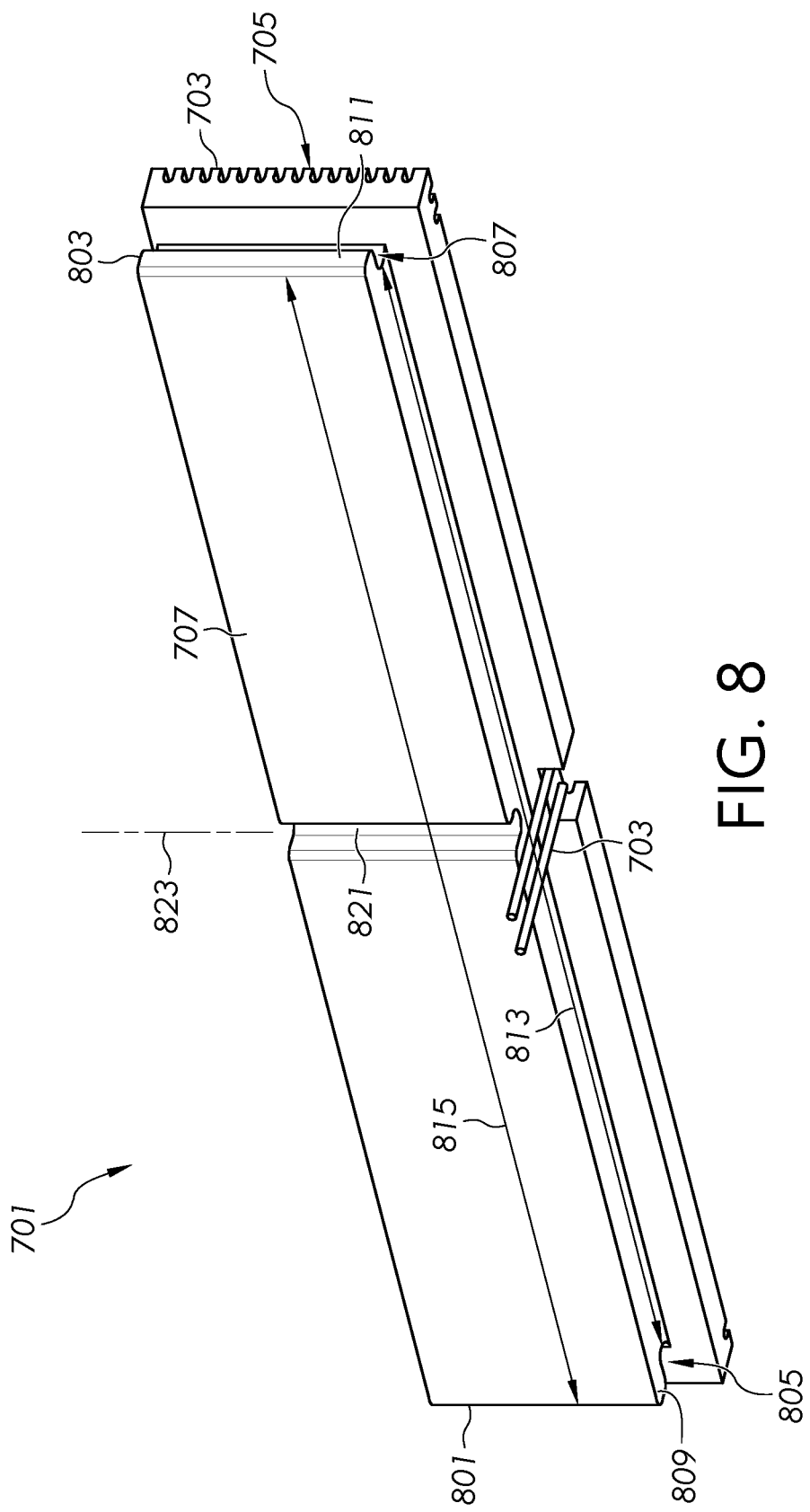
FIG. 8 illustrates a rear perspective view of the heating element of FIG. 7 in accordance with embodiments of the disclosure.

Referring to FIG. 8, a rear perspective view of the insulating block 707 of the heating element 701 is illustrated. In some embodiments, the insulating block 707 can comprise one or more openings (e.g., grooves, channels, etc.) that can facilitate attachment of the heating element 701 to the support apparatus 325. For example, the insulating block 707 can extend between a first end 801 and a second end 803. In some embodiments, the heating element 701 can comprise a first opening 805 and a second opening 807. The first opening 805 can be located at the first end 801 and the second opening 807 can be located at the second end 803. The first opening 805 can be bordered by a first wall 809 while the second opening 807 can be bordered by a second wall 811. In some embodiments, a first distance 813 can separate the first opening 805 and the second opening 807. In some embodiments, a second distance 815 can separate an end of the first wall 809 and the second wall 811. The first distance 813 may be less than the second distance 815. In some embodiments, the insulating block 707 can comprise a third opening 821 that can extend through a center of the insulating block 707. For example, the third opening 821 can extend along an axis 823 that is perpendicular to an axis along which the first distance 813 and the second distance 815 are measured.

Figure 9:
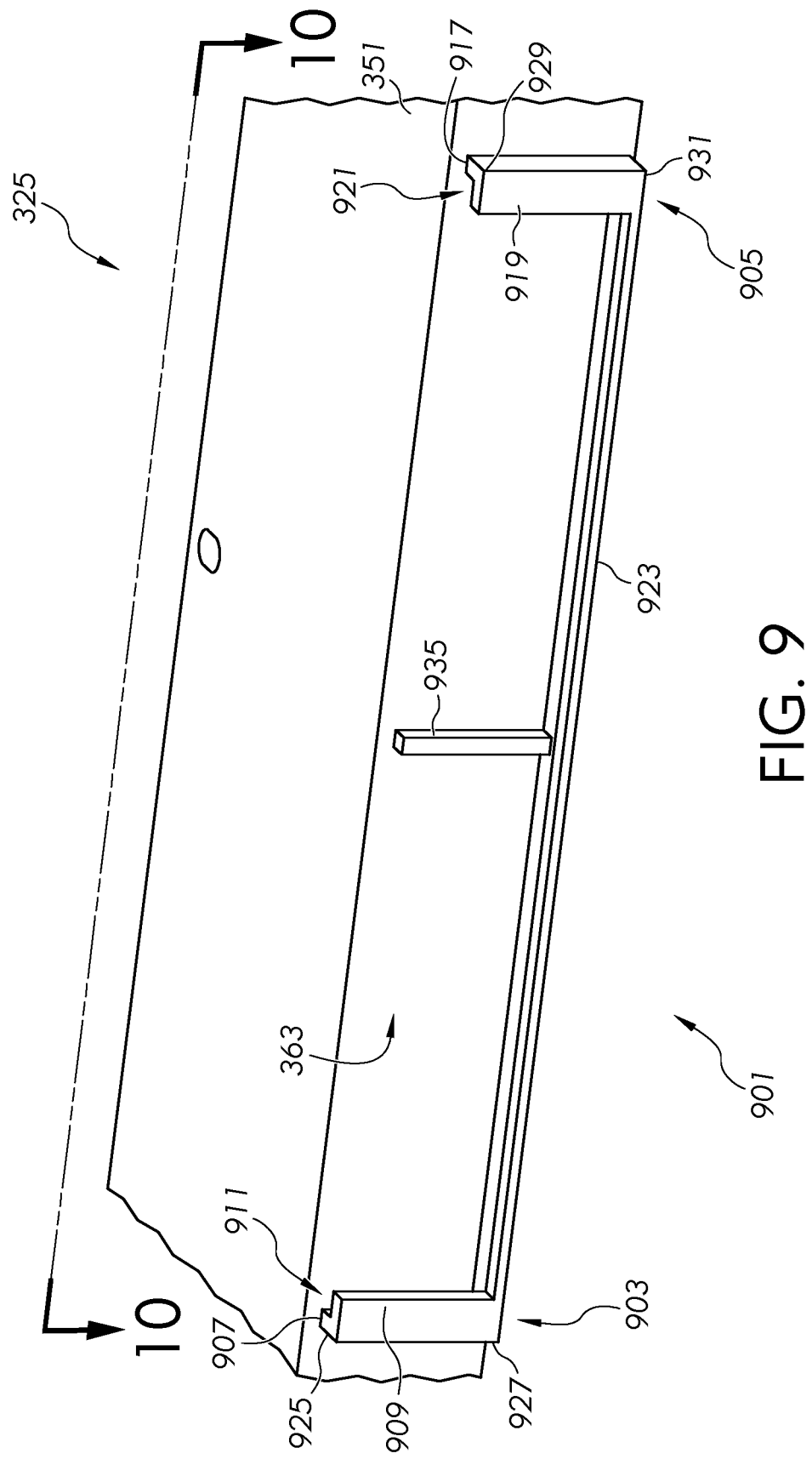
FIG. 9 illustrates a front perspective view of an attachment apparatus of a support plate in accordance with embodiments of the disclosure.

Referring to FIG. 9, a front perspective view of the support plate 351 is illustrated. In some embodiments, the support plate 351 of the support apparatus 325 can comprise an attachment apparatus 901 comprising a plurality of attachment brackets extending from the second surface 363 toward the forming vessel 140. For example, the plurality of attachment brackets can comprise a first attachment bracket 903 and a second attachment bracket 905 that can extend from the second surface 363 toward the forming vessel 140. The attachment apparatus 901 can attach the heating portion 702 to the support plate 351. For example, the first attachment bracket 903 can comprise a first wall 907 and a second wall 909. The first wall 907 can extend from the second surface 363, for example, by extending substantially perpendicularly from the second surface 363. The first wall 907 can be attached to the second surface 363 in several ways. For example, in some embodiments, the first wall 907 can be formed with (e.g., as a one-piece structure) with the second surface 363, while in other embodiments, the first wall 907 can be separately attached to the second surface 363 (e.g., with mechanical fasteners, adhesives, etc.). In some embodiments, the second wall 909 can be attached to the first wall 907 opposite the second surface 363. For example, the first wall 907 can be attached at one end to the second surface 363 and at an opposing end to the second wall 909. In some embodiments, the second wall 909 can extend substantially perpendicularly from the first wall 907. For example, the second wall 909 can project from the first wall 907 toward the second attachment bracket 905. The second wall 909 can be attached to the first wall 907 in several ways. For example, in some embodiments, the second wall 909 can be formed with (e.g., as a one-piece structure) with the first wall 907, while in other embodiments, the second wall 909 can be separately attached to the first wall 907 (e.g., with mechanical fasteners, adhesives, etc.). In some embodiments, the second wall 909 can form a first opening 911 between the second wall 909 and the second surface 363. For example, the first opening 911 may be bordered by the second surface 363, the first wall 907, and the second wall 909.

The second attachment bracket 905 can be substantially identical to the first attachment bracket 903, with the second attachment bracket 905 spaced a distance apart from the first attachment bracket 903. For example, the second attachment bracket 905 can comprise a third wall 917 and a fourth wall 919. The third wall 917 can extend from the second surface 363, for example, by extending substantially perpendicularly from the second surface 363. In some embodiments, the third wall 917 can extend substantially parallel to the first wall 907. The third wall 917 can be attached to the second surface 363 in several ways. For example, in some embodiments, the third wall 917 can be formed with (e.g., as a one-piece structure) with the second surface 363, while in other embodiments, the third wall 917 can be separately attached to the second surface 363 (e.g., with mechanical fasteners, adhesives, etc.). In some embodiments, the fourth wall 919 can be attached to the third wall 917 opposite the second surface 363. For example, the third wall 917 can be attached at one end to the second surface 363 and at an opposing end to the fourth wall 919. In some embodiments, the fourth wall 919 can extend substantially perpendicularly from the third wall 917. For example, the fourth wall 919 can project from the third wall 917 toward the first attachment bracket 903. The fourth wall 919 can be attached to the third wall 917 in several ways. For example, in some embodiments, the fourth wall 919 can be formed with (e.g., as a one-piece structure) with the third wall 917, while in other embodiments, the fourth wall 919 can be separately attached to the third wall 917 (e.g., with mechanical fasteners, adhesives, etc.). In some embodiments, the fourth wall 919 can form a second opening 921 between the fourth wall 919 and the second surface 363. For example, the second opening 921 may be bordered by the second surface 363, the third wall 917, and the fourth wall 919.

In some embodiments, the attachment apparatus 901 can comprise a ledge 923. The ledge 923 can extend from the second surface 363 toward the forming vessel 140. In some embodiments, the ledge 923 can extend partially between the first attachment bracket 903 and the second attachment bracket 905. For example, the first attachment bracket 903 can extend between a first end 925 and a second end 927 while the second attachment bracket 905 can extend between a first end 929 and a second end 931. In some embodiments, the ledge 923 can be attached to the second end 927 of the first attachment bracket 903 and the second end 931 of the second attachment bracket 905. In some embodiments, the first end 925 of the first attachment bracket 903 and the first end 929 of the second attachment bracket 905 may be unbounded. In some embodiments, the heating element 701 may be configured to be received within the attachment apparatus 901, for example, through the first end 925 of the first attachment bracket 903 and the first end 929 of the second attachment bracket 905, whereupon the heating element 701 can rest on and/or be supported by the ledge 923 located at the second end 927 of the first attachment bracket 903 and the second end 931 of the second attachment bracket 905. For example, as illustrated in FIG. 10, one of the plurality of attachment brackets (e.g., the second attachment bracket 905) can be received within the first opening 805 of the heating element 701, and another of the plurality of attachment brackets (e.g., the first attachment bracket 903) can be received within the second opening 807 when the heating element 701 is attached to the second surface 363.

In some embodiments, the attachment apparatus 901 can comprise a third attachment bracket 935. The third attachment bracket 935 can extend from the second surface 363 toward the forming vessel 140. In some embodiments, the third attachment bracket 935 can extend substantially parallel to the first attachment bracket 903 and the second attachment bracket 905, with the third attachment bracket 935 positioned between the first attachment bracket 903 and the second attachment bracket 905. The third attachment bracket 935 can comprise an outcropping, a protuberance, an extension, etc. that projects from the second surface 363. In some embodiments, the third attachment bracket 935 can be attached to the ledge 923, wherein one end of the third attachment bracket 935 can be attached to the ledge 923 while an opposing end of the third attachment bracket 935 can be unbounded. In this way, the third attachment bracket 935 can extend along an axis that can intersect the ledge 923.

Figure 10:
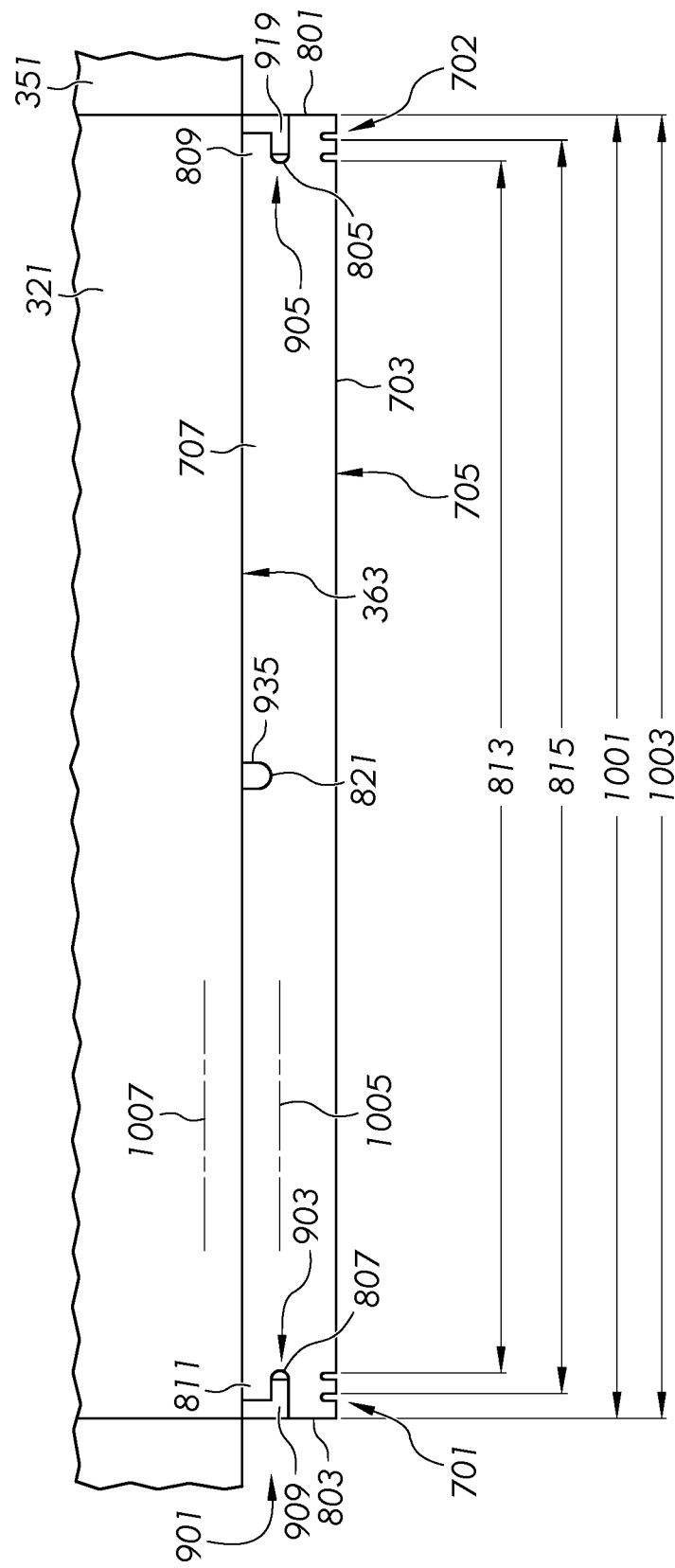
FIG. 10 illustrates a top-down view of the heating element and the attachment apparatus as viewed along line 10-10 of FIG. 9 in accordance with embodiments of the disclosure.

FIG. 10 illustrates a top-down view of the heating element 701 and the attachment apparatus 901 as viewed along line 10-10 of FIG. 9, wherein the heating element is attached to the support plate 351 by the attachment apparatus 901. For example, in some embodiments, the first attachment bracket 903 may be sized and shaped to be received within the second opening 807 at the second end 803 of the insulating block 707. The second attachment bracket 905 may be sized and shaped to be received within the first opening 805 at the first end 801 of the insulating block 707. The heating element 701 can rest on the ledge 923 and, due to the force of gravity, can remain in contact with the ledge 923. In some embodiments, the third attachment bracket 935 can be received within the third opening 821. The heating element 701 may therefore be supported between the first attachment bracket 903 and the second attachment bracket 905, with the third attachment bracket 935 centering the heating element 701. In some embodiments, the first distance 813 (e.g., separating the first opening 805 and the second opening 807) may be less than a distance separating the second wall 909 of the first attachment bracket 903 and the fourth wall 919 of the second attachment bracket 905. The fourth wall 919 can therefore be received within the first opening 805 and the second wall 909 can be received within the second opening 807.

Due to the second distance 815 (e.g., separating the first wall 809 and the second wall 811) being larger than the first distance 813, the first wall 809 and the second wall 811 can maintain the heating element 701 in attachment with the attachment apparatus 901. For example, the first wall 809 may be supported between the support plate 351 and the fourth wall 919 such that the fourth wall 919 can limit the first wall 809 from inadvertently detaching from the second attachment bracket 905. Similarly, the second wall 811 may be supported between the support plate 351 and the second wall 909 such that the second wall 909 can limit the second wall 811 from inadvertently detaching from the first attachment bracket 903. In some embodiments, the first attachment bracket 903 and the second attachment bracket 905 can be spaced a distance apart to facilitate thermal expansion of the heating element 701, wherein the heating element 701 may expand and/or contract due to temperature variations during the glass manufacturing process. In some embodiments, during this thermal expansion, the third attachment bracket 935, which may be received within the third opening 821, can maintain the heating element 701 in a centered position relative to the first attachment bracket 903 and the second attachment bracket 905.

In this way, in some embodiments, the heating element 701 can be attached to the second surface 363 and may be positioned within the support opening 365 (e.g., illustrated in FIG. 3) between the support apparatus 325 (e.g., illustrated in FIG. 3) and the vessel surface 307. Referring briefly to FIG. 3, wherein the heating element 701 can replace a location of the insulating block 327, the heating element 701 can be positioned on the second side 359 of the support plane 355 and spaced apart from the compression block 321. In some embodiments, a first length 1001 of the heating element 701 can substantially match a second length 1003 of the compression block 321. For example, the heating element 701 can extend the first length 1001 between the first end 801 and the second end 803 along a first axis 1005 that may be parallel to the second surface 363. In some embodiments, the compression block 321 can extend the second length 1003 along a second axis 1007 that may be parallel to the first axis 1005. In some embodiments, the first length 1001 of the heating element 701 can be substantially equal to the second length 1003 of the compression block 321.

Figure 12:
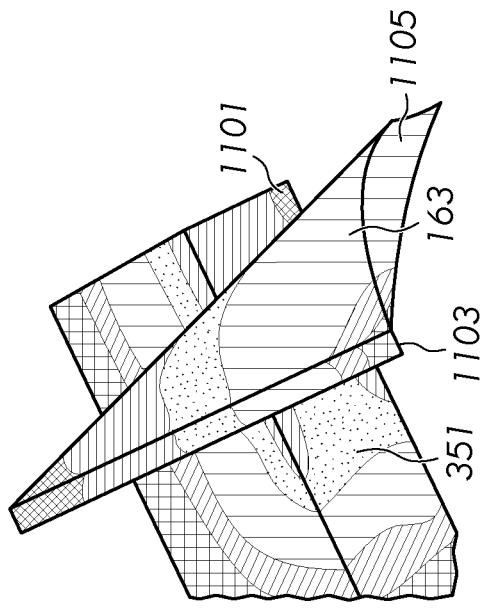
FIG. 12 illustrates a temperature of a support plate and an edge director in accordance with embodiments of the disclosure.
Figure 13:
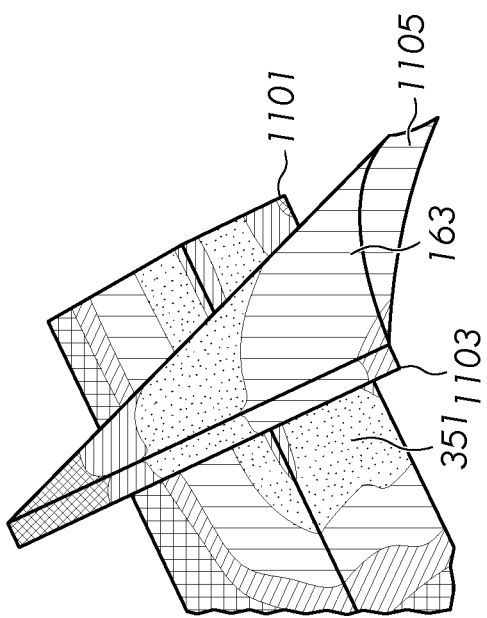
FIG. 13 illustrates a temperature of a support plate and an edge director in accordance with embodiments of the disclosure.
Figure 11:
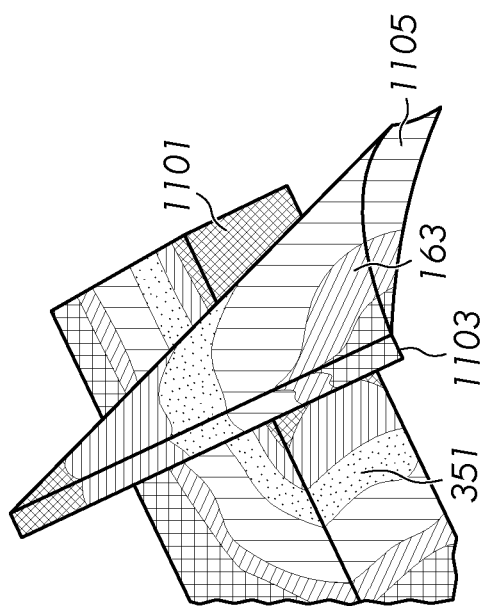
FIG. 11 illustrates a temperature of a support plate and an edge director in accordance with embodiments of the disclosure.

Referring to FIGS. 11-13, embodiments of the support plate 351 and the edge director 163 (e.g., illustrated in FIGS. 1-2) are illustrated, wherein different shadings can represent different temperatures of the support plate 351 and the edge director 163. For example, FIG. 11 illustrates embodiments in which neither the insulating block 327 nor the heating element 701 are provided within the support opening 365 attached to the second surface 363 such that the support opening 365 is void of any structures between the second surface 363 and the forming vessel 140. FIG. 12 illustrates embodiments in which the insulating block 327 is provided within the support opening 365 attached to the second surface 363 such that the support plate 351 is shielded from the forming vessel 140 by the insulating block 327. FIG. 13 illustrates embodiments in which the heating element 701 is provided within the support opening 365 attached to the second surface 363 such that the support plate 351 is shielded from the forming vessel 140 by the heating element 701 and the heating element 701 provides heat to the forming vessel 140 and the edge director 163.

In FIG. 11, the support plate 351 can reach a maximum temperature at a first region 1101, wherein the maximum temperature may be about 1040° C. The edge director 163 can reach a minimum temperature at a second region 1103, wherein the minimum temperature may be about 1100° C. An average temperature of the edge director 163 at a lower region 1105 may be about 1150° C. In FIG. 12, the support plate 351 can reach a maximum temperature at the first region 1101, wherein the maximum temperature may be about 1000° C. The edge director 163 can reach a minimum temperature at the second region 1103, wherein the minimum temperature may be about 1100° C. An average temperature of the edge director 163 at the lower region 1105 may be about 1150° C. In FIG. 13, the support plate 351 can reach a maximum temperature at the first region 1101, wherein the maximum temperature may be about 1000° C. The edge director 163 can reach a minimum temperature at the second region 1103, wherein the minimum temperature may be about 1120° C. An average temperature of the edge director 163 at the lower region 1105 may be about 1160° C. As such, the absence of the insulating block 327 and the heating element 701 (e.g., as illustrated in FIG. 11) can generate the highest maximum temperature of the support plate 351 at the first region 1101 (e.g., about 1040° C.), the lowest minimum temperature of the edge director 163 at the second region 1103 (e.g., about 1100° C.), and the lowest average temperature at the lower region 1105 (e.g., about 1150° C.). In contrast, as compared to the embodiments of FIG. 11, providing the insulating block 327 (e.g., as illustrated in FIG. 12) or the heating element 701 (e.g., as illustrated in FIG. 13) can produce lower maximum temperatures at the first region 1101, higher minimum temperatures at the second region 1103, and higher average temperatures at the lower region 1105. Thus, the insulating block 327 and the heating element 701 can reduce the maximum temperature that the support plate 351 is subjected to and/or can increase the minimum temperature that the edge director 163 can be subjected to.

The compression apparatus 305 provides several benefits that can prolong the lifespan of the compression apparatus 305 and/or the forming vessel 140. For example, due to the insulating block 327 and/or the heating element 701 being attached to the support plate 351 and separated from (e.g., not attached to) the compression block 321, the compression block 321 can move freely and independently of the insulating block 327 and/or the heating element 701. As such, inadvertent detachment of the insulating block 327 and/or the heating element 701 from the support plate 351 may be avoided. By avoiding detachment of the insulating block 327 and/or the heating element 701 from the support plate 351, the insulating block 327 and/or the heating element 701 may remain in place and can thermally insulate the support plate 351 and/or provide heat to the edge director 163. In addition, the support plate 351 can support one or more of the insulating block 327 or the heating element 701, such that thermal insulation of the support plate 351 and an increase in temperature of the edge director 163 can be achieved. In some embodiments, a portion of the compression block 321 may be in contact with the movement plate 349, for example, the first surface portion 601 of the compression block 321, due to a beveled shape of the first surface 331 of the compression block 321 (e.g., wherein the second surface portion 603 and the third surface portion 605 are non-planar relative to the first surface portion 601). As such, a bending moment applied by the compression block 321 to the movement plate 349 can be reduced. In some embodiments, the reduction in the bending moment can reduce a bending stress of the compression block 321 that can result from sagging of the support plate 351. As such, the overall stress on the compression block 321 can be reduced. Further stress reduction on the compression block 321 can also be achieved due to the radius of curvature of the edge surface 337, in which the radius of curvature can be within a range from about 6 mm to about 10 mm, or about 8 mm.

In some embodiments, the movement plate 349 can comprise the friction-reducing material, which can facilitate movement of the compression block 321 relative to the movement plate 349. The friction-reducing material, for example, a copper-oxide based thermal paste, can act as a lubricant between the compression block 321 and the movement plate 349, and may function up to temperatures of about 1500° C.

It should be understood that while various embodiments have been described in detail relative to certain illustrative and specific examples thereof, the present disclosure should not be considered limited to such, as numerous modifications and combinations of the disclosed features are possible without departing from the scope of the following claims.

What is claimed is:

1. A glass manufacturing apparatus comprising:
a forming vessel comprising a first end and a second end, the first end comprising a vessel surface defining a recess;
a compression block positioned within the recess and comprising a first surface and a contact surface that contacts the vessel surface, the compression block configured to apply a force to the forming vessel, the first surface comprising a non-planar shape; and
a support apparatus comprising a support surface supporting the compression block, the support surface in contact with a portion of the first surface,
wherein the first surface comprises a first surface portion, a second surface portion, and a third surface portion, the first surface portion in contact with the support surface and comprising a planar shape, and the second surface portion and the third surface portion are positioned on opposite sides of the first surface portion, the second surface portion forming a first angle that is from about 1 degree to about 3 degrees relative to the first surface portion, the third surface portion forming a second angle that is from about 1 degree to about 3 degrees relative to the first surface portion.

2. The glass manufacturing apparatus of claim 1, wherein the forming vessel is configured to receive a molten material along a flow direction that is parallel to a longitudinal direction of the forming vessel, the compression block configured to apply the force along a force direction that is parallel to the flow direction and the longitudinal direction.

3. The glass manufacturing apparatus of claim 1, wherein the compression block comprises an edge surface that connects the contact surface and the first surface, the edge surface comprising a rounded shape.

4. The glass manufacturing apparatus of claim 1, wherein the support surface extends along a support plane and the compression block is on a first side of the support plane.

5. The glass manufacturing apparatus of claim 1, wherein the support apparatus comprises a second surface spaced apart from the vessel surface to define a support opening, and one or more of:
an insulating block attached to the second surface and positioned within the support opening between the support apparatus and the vessel surface, the insulating block comprising a thermally insulating material configured to thermally insulate the support apparatus from the forming vessel; or
a heating element attached to the second surface and positioned within the support opening between the support apparatus and the vessel surface, the heating element comprising an electrically conductive material configured to increase a temperature of a portion of the forming vessel.

6. The glass manufacturing apparatus of claim 5, wherein the insulating block comprises a first block portion attached to a second block portion, the first block portion comprising a first protrusion and a first cavity, the second block portion comprising a second protrusion and a second cavity, the first protrusion configured to be received within the second cavity and the second protrusion configured to be received within the first cavity.

7. The glass manufacturing apparatus of claim 6, wherein the first block portion and the second block portion comprise a first face that faces the forming vessel and a second face that faces the support apparatus, the second face comprising a face opening extending along an axis when the first block portion is attached to the second block portion.

8. The glass manufacturing apparatus of claim 7, wherein the support apparatus comprises a support protrusion extending from the second surface toward the forming vessel, the support protrusion configured to be received within the face opening to attach the first block portion and the second block portion to the support apparatus.

9. A glass manufacturing apparatus comprising:
a forming vessel comprising a first end and a second end, the first end comprising a vessel surface defining a recess;
a compression block positioned within the recess and comprising a contact surface that contacts the vessel surface, the compression block configured to apply a force to the forming vessel;
a support apparatus comprising a support surface supporting the compression block, the support apparatus comprising a second surface spaced apart from the vessel surface to define a support opening; and
an insulating block attached to the second surface and positioned within the support opening between the support apparatus and the vessel surface, the insulating block comprising a thermally insulating material configured to thermally insulate the support apparatus from the forming vessel,
wherein the insulating block comprises a first block portion attached to a second block portion, the first block portion comprising a first protrusion and a first cavity, the second block portion comprising a second protrusion and a second cavity, the first protrusion configured to be received within the second cavity and the second protrusion configured to be received within the first cavity.

10. The glass manufacturing apparatus of claim 9, wherein the first block portion and the second block portion comprise a first face that faces the forming vessel and a second face that faces the support apparatus, the second face comprising a face opening extending along an axis when the first block portion is attached to the second block portion.

11. The glass manufacturing apparatus of claim 10, wherein the support apparatus comprises a support protrusion extending from the second surface toward the forming vessel, the support protrusion configured to be received within the face opening to attach the first block portion and the second block portion to the support apparatus.

12. The glass manufacturing apparatus of claim 9, wherein the forming vessel is configured to receive a molten material along a flow direction that is parallel to a longitudinal direction of the forming vessel, the compression block configured to apply the force along a force direction that is parallel to the flow direction and the longitudinal direction.

13. The glass manufacturing apparatus of claim 9, wherein the compression block comprises an edge surface that connects the contact surface and a first surface of the compression block, the edge surface comprising a rounded shape.

14. The glass manufacturing apparatus of claim 9, wherein the contact surface comprises a non-planar shape.

15. A glass manufacturing apparatus comprising:
- a forming vessel comprising a first end and a second end, the first end comprising a vessel surface defining a recess;
- a compression block positioned within the recess and comprising a contact surface that contacts the vessel surface, the compression block configured to apply a force to the forming vessel;
- a support apparatus comprising a support surface supporting the compression block, the support apparatus comprising a second surface spaced apart from the vessel surface to define a support opening; and
- a heating element attached to the second surface and positioned within the support opening between the support apparatus and the vessel surface, the heating element comprising an electrically conductive material configured to increase a temperature of a portion of the forming vessel.

16. The glass manufacturing apparatus of claim 15, wherein the support apparatus comprises a plurality of attachment brackets extending from the second surface toward the forming vessel.

17. The glass manufacturing apparatus of claim 16, wherein the heating element comprises a first opening and a second opening, one of the plurality of attachment brackets received within the first opening and another of the plurality of attachment brackets received within the second opening when the heating element is attached to the second surface.

18. The glass manufacturing apparatus of claim 15, wherein the heating element extends a first length between a first end and a second end along a first axis parallel to the second surface, the compression block extending a second length along a second axis parallel to the first axis, wherein the first length is substantially equal to the second length.

19. The glass manufacturing apparatus of claim 15, wherein the forming vessel is configured to receive a molten material along a flow direction that is parallel to a longitudinal direction of the forming vessel, the compression block configured to apply the force along a force direction that is parallel to the flow direction and the longitudinal direction.

* * * * *